United States Patent
Maeto

(10) Patent No.: US 12,230,297 B2
(45) Date of Patent: Feb. 18, 2025

(54) MAGNETIC DISK DEVICE WITH ENHANCED CONTROL OF WRITE PROCESSING BASED ON A SHIFT IN DRIFT OF LEVEL (DOL)

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/897,911

(22) Filed: Aug. 29, 2022

(65) Prior Publication Data
US 2023/0260540 A1    Aug. 17, 2023

(30) Foreign Application Priority Data

Feb. 16, 2022    (JP) .................................. 2022-022153
Jul. 14, 2022    (JP) .................................. 2022-113281

(51) Int. Cl.
| | |
|---|---|
| *G11B 5/09* | (2006.01) |
| *G11B 5/012* | (2006.01) |
| *G11B 5/55* | (2006.01) |
| *G11B 5/56* | (2006.01) |
| *G11B 5/596* | (2006.01) |

(52) U.S. Cl.
CPC ................ *G11B 5/09* (2013.01); *G11B 5/012* (2013.01); *G11B 5/5556* (2013.01); *G11B 5/56* (2013.01); *G11B 5/59627* (2013.01)

(58) Field of Classification Search
None
See application file for complete search history.

(56) References Cited

U.S. PATENT DOCUMENTS

| | | |
|---|---|---|
| 10,650,860 B2 | 5/2020 | Maeto et al. |
| 10,748,567 B1 | 8/2020 | Zaitsu et al. |
| 10,777,227 B2 | 9/2020 | Kashiwagi et al. |
| 10,910,013 B1 | 2/2021 | Kawabe et al. |
| 2017/0186455 A1* | 6/2017 | Hara .................. G11B 5/59627 |
| 2019/0378543 A1 | 12/2019 | Maeto et al. |
| 2020/0294547 A1* | 9/2020 | Yamamoto et al. ......................... G11B 20/10388 |
| 2021/0398559 A1* | 12/2021 | Kawabe et al. . G11B 20/10388 |

FOREIGN PATENT DOCUMENTS

JP    2019-215943 A    12/2019

* cited by examiner

Primary Examiner — Craig A. Renner
(74) Attorney, Agent, or Firm — Maier & Maier, PLLC

(57) ABSTRACT

According to one embodiment, a magnetic disk device includes a disk, a head configured to write data to the disk and read the data from the disk, and a controller configured to control write processing based on a first determination value corresponding to a first shift amount defined for the excessive number of times at which the first shift amount of the head in a radial direction of the disk exceeds a first threshold value causing a read error in a second track adjacent to a first track in the radial direction at a time of the write processing of the first track of the disk, and a second threshold value changing the write processing.

19 Claims, 12 Drawing Sheets

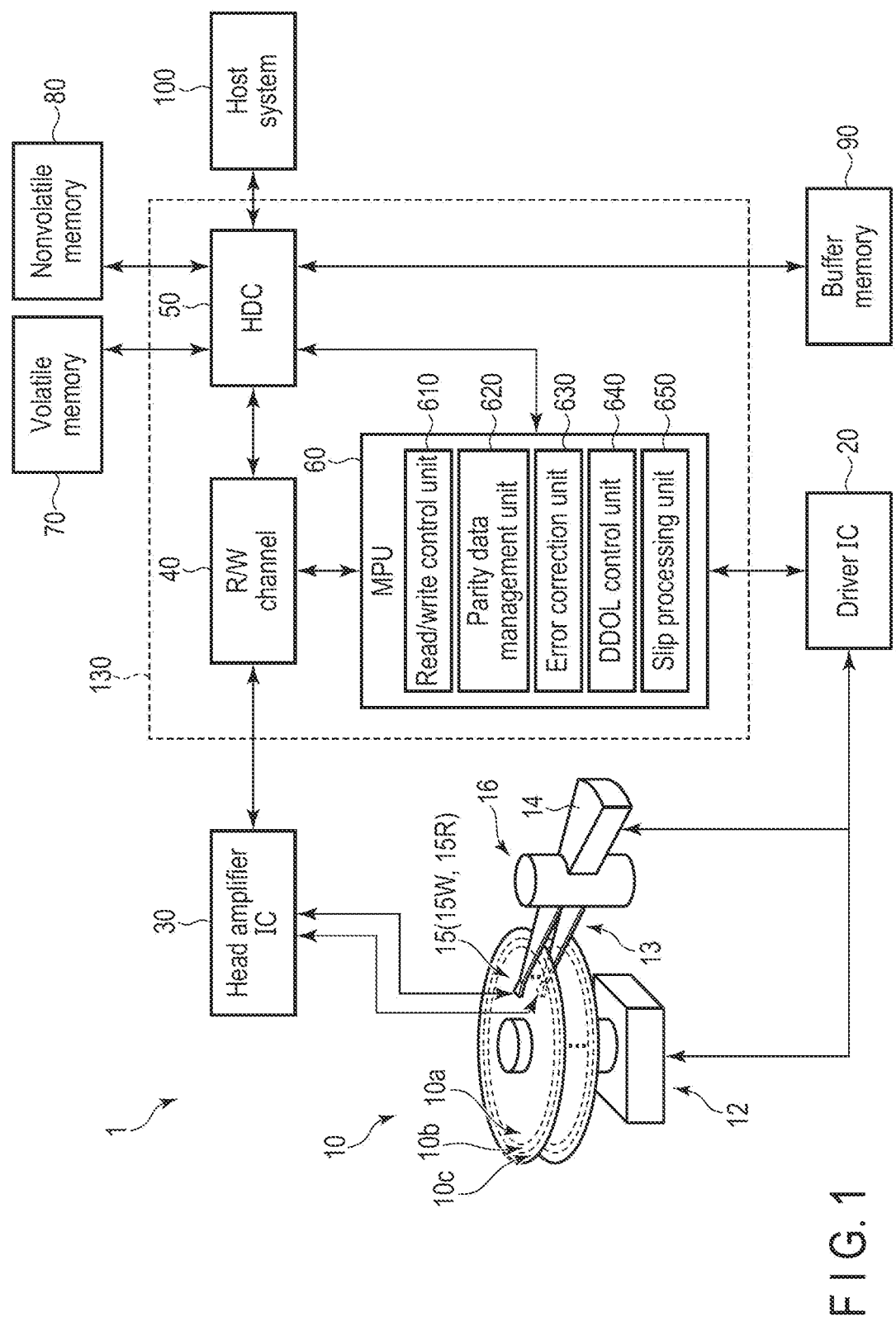
F I G. 1

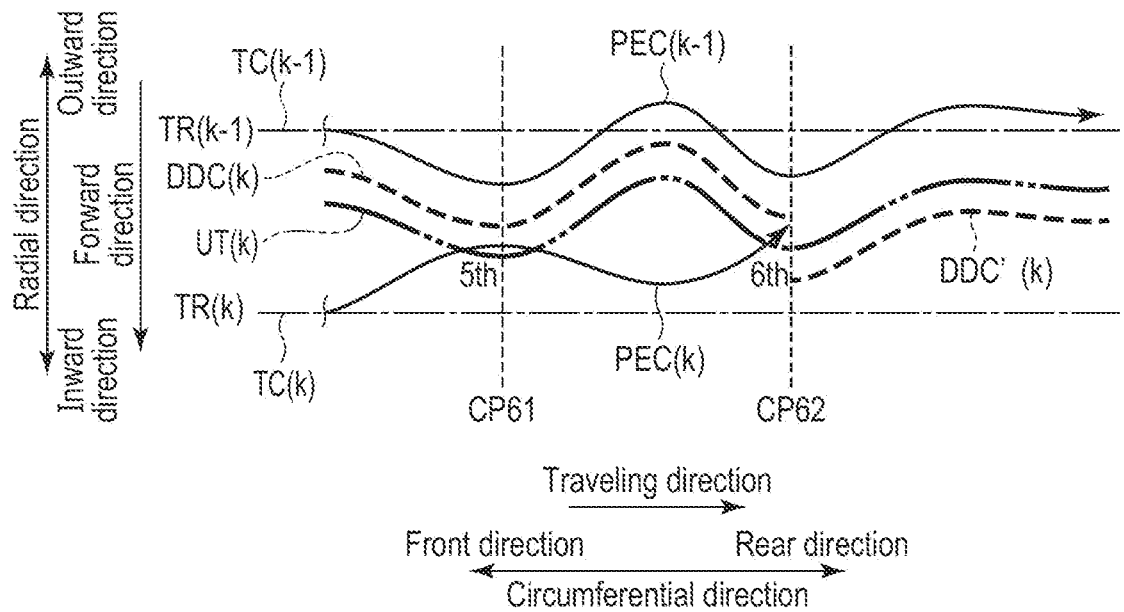
F I G. 7
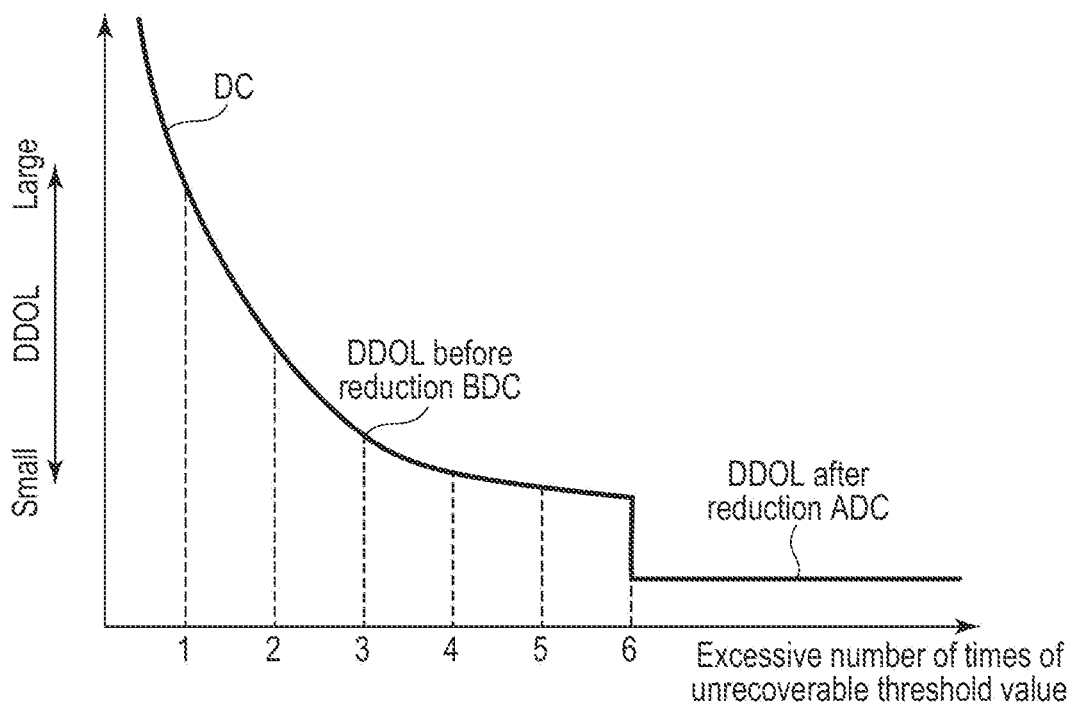
F I G. 8

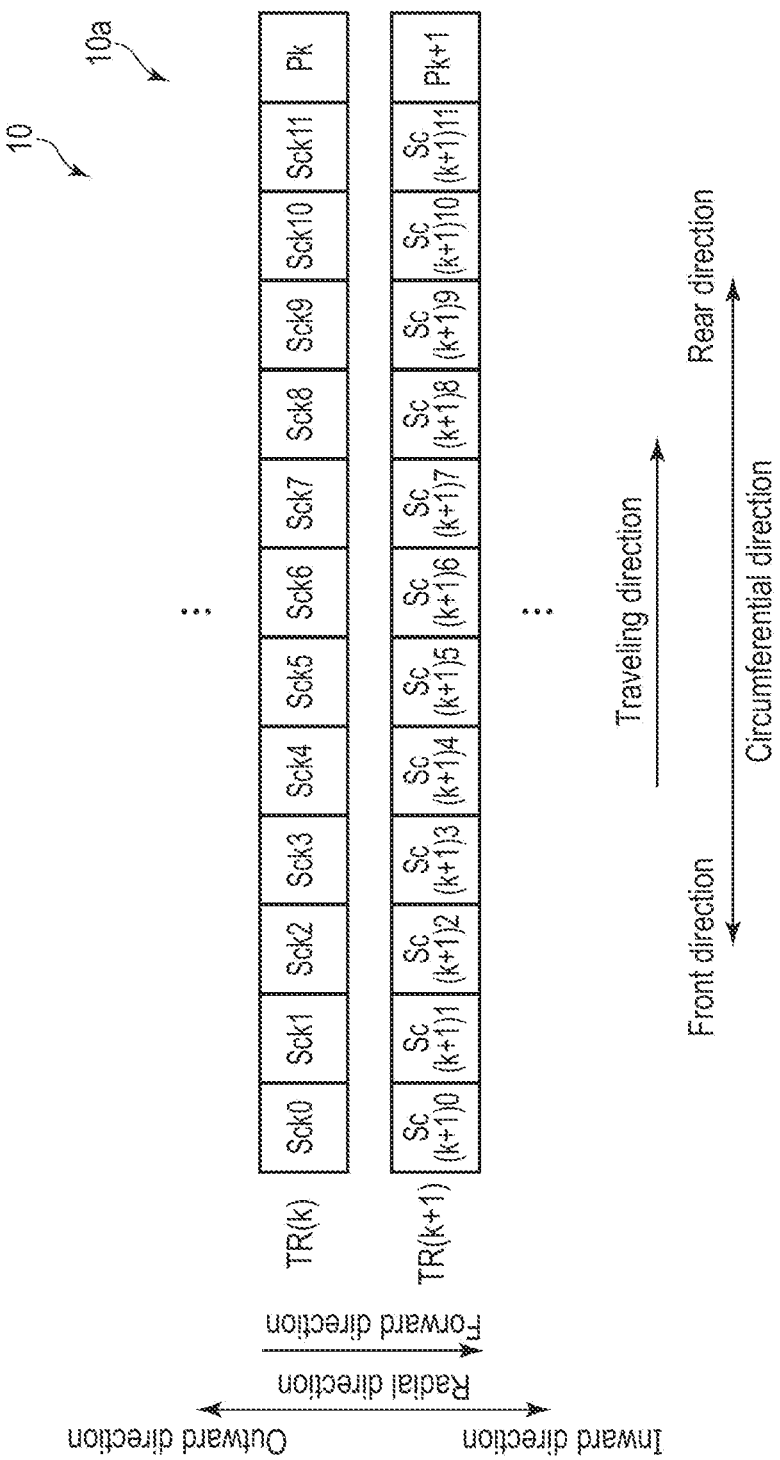
F I G. 9

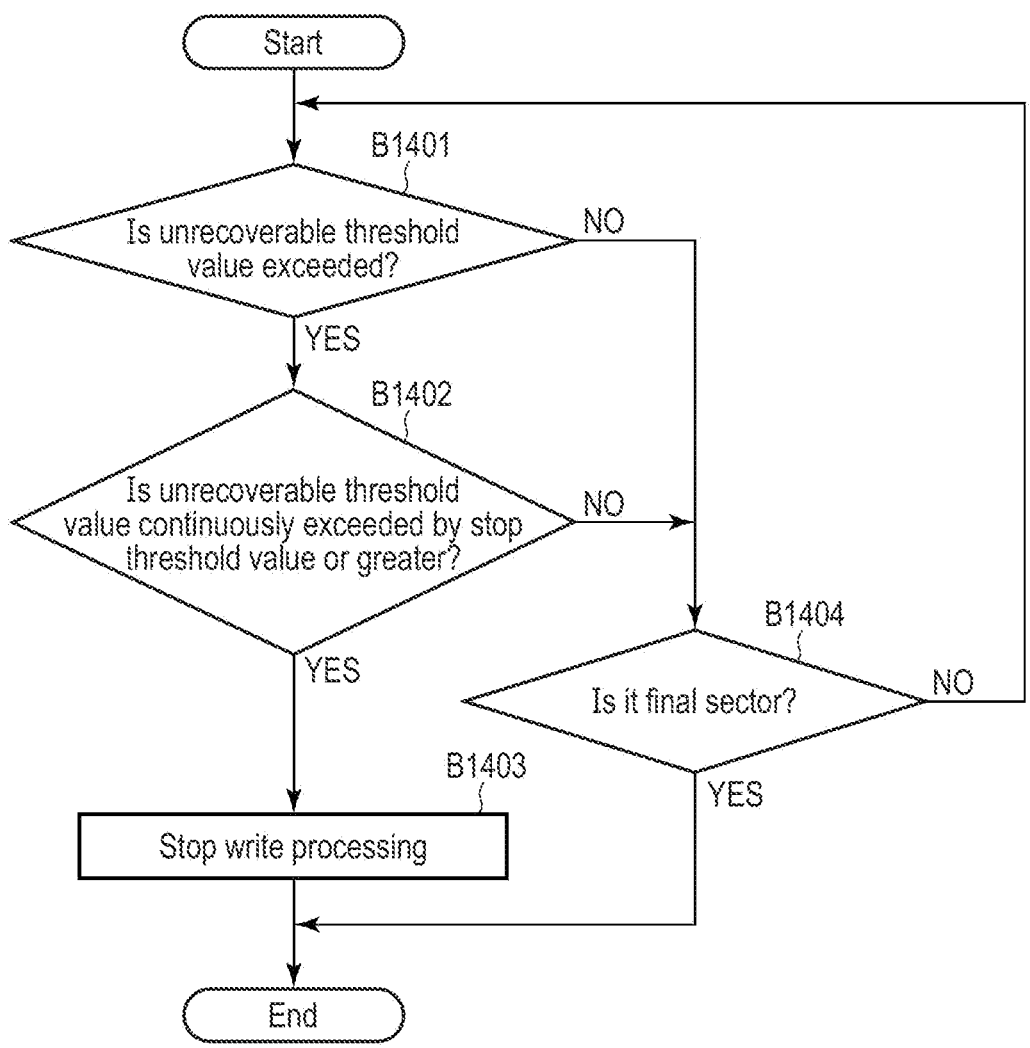
F I G. 14

MAGNETIC DISK DEVICE WITH ENHANCED CONTROL OF WRITE PROCESSING BASED ON A SHIFT IN DRIFT OF LEVEL (DOL)

CROSS-REFERENCE TO RELATED APPLICATIONS

This application is based upon and claims the benefit of priority from Japanese Patent Applications No. 2022-022153, filed Feb. 16, 2022; and No. 2022-113281, filed Jul. 14, 2022, the entire contents of all of which are incorporated herein by reference.

FIELD

Embodiments described herein relate generally to a magnetic disk device and a write processing method.

BACKGROUND

In recent years, a magnetic disk device in a technology for realizing high recording density has been developed. As a magnetic disk device that realizes the high recording density, there is a magnetic disk device capable of executing shingled recording (shingled write magnetic recording (SMR), or a shingled write recording (SWR)) in which a plurality of tracks are overwritten in a radial direction of a disk.

The magnetic disk device has a track including a parity sector obtained by performing an exclusive OR (XOR) operation on each sector of a predetermined track. In a case where an error is detected in a predetermined sector of this track, the magnetic disk device executes error correction processing for correcting an error with an error correction code based on a parity sector corresponding to the track (hereinafter, it may be referred to as track ECC processing). Whether or not an error sector, in which a read error in which reading cannot be performed occurs, can be corrected in the track ECC processing can be determined based on a relationship between the number of sectors in which the read error may occur in a predetermined track and a position of a radial direction of a disk as a target of the predetermined track (hereinafter, it may be simply referred to as a radial direction), for example, a squeeze amount corresponding to a distance from a center position of the track in the radial direction or an approach amount from a track target position of the predetermined track to a track target position of a track adjacent to the predetermined track in the radial direction.

BRIEF DESCRIPTION OF THE DRAWINGS

FIG. 1 is a block diagram illustrating a configuration of a magnetic disk device according to a first embodiment.

FIG. 7 is a schematic diagram illustrating an example of a DDOL tightening processing according to the first embodiment.

FIG. 8 is a schematic diagram illustrating an example of a change in a DDOL for the excessive number of times of unrecoverable threshold value according to the first embodiment.

FIG. 9 is a schematic diagram illustrating an example of a configuration of a track.

FIG. 14 is a flowchart illustrating an example of a write processing method according to a second embodiment.

DETAILED DESCRIPTION

Figure 2:
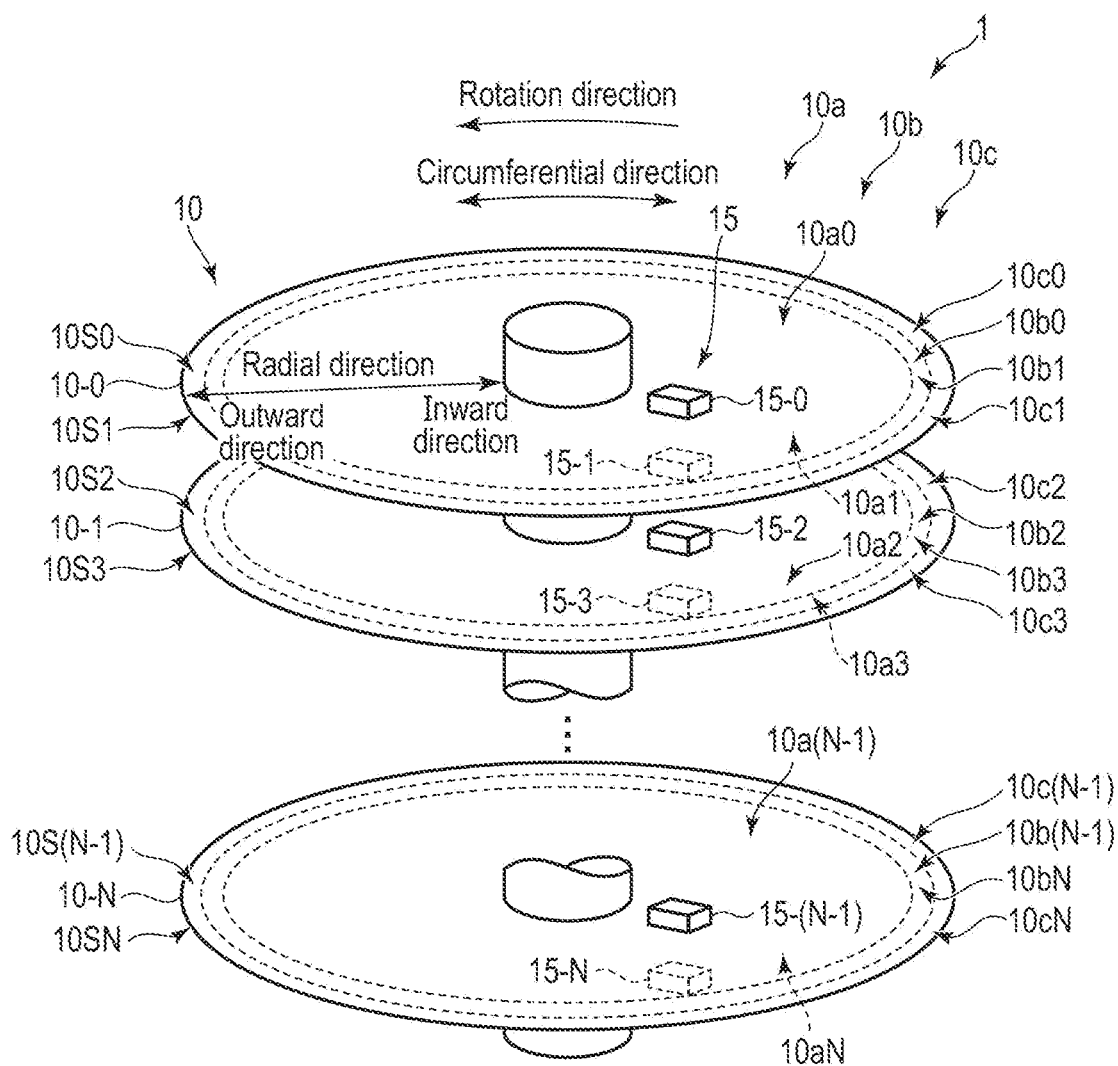
FIG. 2 is a schematic view illustrating an example of an arrangement of heads with respect to each disk according to the first embodiment.

In general, according to one embodiment, there is provided a magnetic disk device comprising: a disk; a head configured to write data to the disk and read the data from the disk; and a controller configured to control write processing based on a first determination value corresponding to a first shift amount defined for the excessive number of times at which the first shift amount of the head in a radial direction of the disk exceeds a first threshold value causing a read error in a second track adjacent to a first track in the radial direction at a time of the write processing of the first track of the disk, and a second threshold value changing the write processing.

According to another embodiment, there is provided a magnetic disk device comprising: a disk; a head configured to write data to the disk and read the data from the disk; and a controller configured to control write processing in a case where a first shift amount of the head in a radial direction of the disk exceeds, continuously a plurality of times, a first threshold value causing a read error in a second track adjacent to a first track in the radial direction at a time of the write processing of the first track of the disk.

According to another embodiment, there is provided a write processing method which is applied to a magnetic disk device including a disk, and a head configured to write data to the disk and read the data from the disk. The write processing method comprises controlling write processing based on a first determination value corresponding to a first shift amount defined for the excessive number of times at which the first shift amount of the head in a radial direction of the disk exceeds a first threshold value causing a read error in a second track adjacent to a first track in the radial direction at a time of the write processing of the first track of the disk, and a second threshold value changing the write processing.

Hereinafter, embodiments will be described with reference to the drawings. The drawings are merely examples, and do not limit the scope of the invention.

First Embodiment

FIG. 1 is a block diagram illustrating a configuration of a magnetic disk device 1 according to a first embodiment.

As shown in FIG. 1, the magnetic disk device 1 comprises a head disk assembly (HDA) which will be described below, a driver IC 20, a head amplifier integrated circuit (hereinafter, a head amplifier IC or a preamplifier) 30, a volatile memory 70, a nonvolatile memory 80, a buffer memory (buffer) 90, and a system controller 130 which is a one-chip integrated circuit. Furthermore, the magnetic disk device 1 is connected to a host system (hereinafter, simply referred to as a host) 100.

The HDA includes a magnetic disk (hereinafter, referred to as a disk) 10, a spindle motor (hereinafter, referred to as SPM) 12, an arm 13 on which a head 15 is mounted, and a voice coil motor (hereinafter, referred to as VCM) 14. The disk 10 is installed to the SPM 12 and is rotated by driving of the SPM 12. The arm 13 and the VCM 14 constitute an actuator 16. The arm 13 includes at least one arm 13. For example, the arm 13 includes a plurality of arms 13. The head 15 includes at least one head 15. For example, the head 15 includes a plurality of heads 15. The actuator 16 controls a movement of the head 15 mounted on the arm 13 to a predetermined position on the disk 10 by driving the VCM 14. Two or more actuators 16 may be provided.

The disk 10 allocates, in a region to which data can be written, a user data region 10a that can be accessed from a user, a media cache (or it may be referred to as a media cache region) 10b that temporarily holds data (or a command) transferred from a host before being written to a predetermined region of the user data region 10a, and a system area 10c to which information necessary for system management is written. The media cache 10b may not be disposed on the disk 10. Hereinafter, a direction from an inner circumference to an outer circumference of the disk 10 or a direction from the outer circumference to the inner circumference of the disk 10 is referred to as a radial direction. In the radial direction, a direction from the inner circumference to the outer circumference is referred to as an outward direction (or outside), and a direction from the outer circumference to the inner circumference, that is, a direction opposite to the outward direction is referred to as an inward direction (or inside). A direction orthogonal to the radial direction of the disk 10 is referred to as a circumferential direction. The circumferential direction corresponds to a direction along the circumference of the disk 10. Furthermore, a predetermined position in the radial direction of the disk 10 may be referred to as a radial position, and a predetermined position in the circumferential direction of the disk 10 may be referred to as a circumferential position. The radial position and the circumferential position may be collectively and simply referred to as a position. A "track (or cylinder)" is used as one region of a plurality of regions divided in the radial direction of the disk 10, data written to one region of a plurality of regions divided in the radial direction of the disk 10, a path of the head 15 at a predetermined radial position, data extending in the circumferential direction of the disk 10, data for one round written to a track (or cylinder) at a predetermined radial position, data written to a predetermined track (or cylinder) of the disk 10, a part of data written to the predetermined track (or cylinder) of the disk 10, or other various meanings. A "sector" is used as one region of a plurality of regions obtained by dividing a predetermined track (or cylinder) of the disk 10 in the circumferential direction, data written to one region of a plurality of regions obtained by dividing the predetermined track (or cylinder) of the disk 10 in the circumferential direction, data written at a predetermined circumferential position at a predetermined radial position of the disk 10, data written to a predetermined sector of the predetermined track (or cylinder) of the disk 10, or other various meanings. A "width of the track (or cylinder) in the radial direction" may also be referred to as a "track width (or cylinder width)". A "path passing through a center position of the track width (or cylinder width) in a predetermined track (or cylinder)" is referred to as a "track center (or cylinder center)". Hereinafter, the "track center (or cylinder center) of a predetermined track (or cylinder)" may be simply referred to as a "track (or cylinder)".

The head 15 faces the disk 10. For example, one head 15 faces one surface of the disk 10. The head 15 includes a write head 15W and a read head 15R, which are mounted on a slider as a main body. The write head 15W writes data to the disk 10. The read head 15R reads data written to the disk 10. The "write head 15W" may be simply referred to as a "head 15", the "read head 15R" may be simply referred to as a "head 15", or the "write head 15W and read head 15R" may be collectively referred to as a "head 15". A "center portion of the head 15" may be referred to as a "head 15", a "center portion of the write head 15W" may be referred to as a "write head 15W", and a "center portion of the read head 15R" may be referred to as a "read head 15R". The "center portion of the write head 15W" may be simply referred to as a "head 15", and the "center portion of the read head 15R" may be simply referred to as a "head 15". "Positioning the center portion of the head 15 at a predetermined position" may be expressed as "positioning the head 15 at a predetermined position", "disposing the head 15 at predetermined position", and "positioning the head 15 at a predetermined position". "Positioning the center portion of the head 15 at a position as a target of a predetermined region (hereinafter, it may be referred to as a region target position), for example, at a center of a predetermined region in the radial direction" may be expressed as "positioning the head 15 in a predetermined region", "disposing the head 15 in a predetermined region", "locating the head 15 in a predetermined region", "positioned in a predetermined region", "disposed in a predetermined region", or "located in a predetermined region". "Positioning the center portion of the head 15 at a position as a target of a predetermined track (or cylinder) (hereinafter, it may be referred to as a track target position (or a cylinder target position)), for example, at a track center (or cylinder center)" may be expressed as "positioning the head 15 in a predetermined track (or cylinder)", "disposing the head 15 in a predetermined track (or cylinder)", "locating the head 15 in a predetermined track (or cylinder)", "positioned in a track", "disposed in a track (or cylinder)", or "located in a track (or cylinder)".

FIG. 2 is a schematic view illustrating an example of an arrangement of the head 15 with respect to the disk 10 according to the present embodiment. As shown in FIG. 2, in the circumferential direction, a direction in which the disk 10 is rotated is referred to as a rotation direction. In the example illustrated in FIG. 2, the rotation direction is indicated in a counterclockwise direction, but may be indicated in an opposite direction (clockwise direction).

In the example illustrated in FIG. 2, the disk 10 includes a disk 10-0, a disk 10-1, . . . , and a disk 10-N. The disks 10-0 to 10-N are coaxially stacked at intervals in one direction. The diameters of the disks 10-0 to 10-N are the same. Terms such as "same", "identical", "coincide", and "equivalent" include not only exactly the same meaning but also the meaning of being different to the extent that it can be regarded as being substantially the same. The diameters of the disks 10-0 to 10-N may be different. In the example illustrated in FIG. 2, the disk 10 has the user data region 10a, the media cache 10b, and the system area 10c. The user data region 10a, the media cache 10b, and the system area 10c are disposed in the order described from the inside to the outside on the disk 10. In other words, the media cache 10b is adjacent to the user data region 10a in the outward direction. The system area 10c is adjacent to the media cache 10b in the outward direction. Here, "adjacent" includes a case where data, an object, a region, a space, and the like are arranged in contact with one another but also includes a case where the data, the object, the region, the space, and the like are arranged at predetermined intervals. The user data region 10a, the media cache 10b, and the system area 10c may be disposed in an order other than in the example illustrated in FIG. 2 on the disk 10. Furthermore, the user data region 10a, the media cache 10b, and the system area 10c may be disposed on the disk 10 in a distributed manner.

The disk 10-0 has a front surface 10S0 and a back surface 10S1 on an opposite side of the front surface 10S0. The front surface 10S0 has a user data region 10a0, a media cache 10b0, and a system area 10c0. The media cache 10b0 is adjacent to the user data region 10a0 in the outward direction. The system area 10c0 is adjacent to the media cache 10b0 in the outward direction. The back surface 10S1 has a user data region 10a1, a media cache 10b1, and a system area 10c1. The media cache 10b1 is adjacent to the user data region 10a1 in the outward direction. The system area 10c1 is adjacent to the media cache 10b1 in the outward direction. Hereinafter, the front surface and back surface of the disk may be referred to as a recording surface.

The disk 10-1 has a front surface 10S2 and a back surface 10S3 on an opposite side of the front surface 10S2. The front surface 10S2 has a user data region 10a2, a media cache 10b2, and a system area 10c2. The media cache 10b2 is adjacent to the user data region 10a2 in the outward direction. The system area 10c2 is adjacent to the media cache 10b2 in the outward direction. The back surface 10S3 has a user data region 10a3, a media cache 10b3, and a system area 10c3. The media cache 10b3 is adjacent to the user data region 10a3 in the outward direction. The system area 10c3 is adjacent to the media cache 10b3 in the outward direction.

The disk 10-N has a front surface 10S(N−1) and a back surface 10SN on an opposite side of the front surface 10S(N−1). The front surface 10S(N−1) has a user data region 10a(N−1), a media cache 10b(N−1), and a system area 10c(N−1). The media cache 10b(N−1) is adjacent to the user data region 10a(N−1) in the outward direction. The system area 10c(N−1) is adjacent to the media cache 10b(N−1) in the outward direction. The back surface 10SN has a user data region 10aN, a media cache 10bN, and a system area 10cN. The media cache 10bN is adjacent to the user data region 10aN in the outward direction. The system area 10cN is adjacent to the media cache 10bN in the outward direction.

In FIG. 2, the head 15 includes a head 15-0, a head 15-1, a head 15-2, a head 15-3, . . . , a head 15-(N−1), and a head 15-N. The head 15-0 faces the front surface 10S0. The head 15-0 writes data to the front surface 10S0 and reads the data from the front surface 10S0. The head 15-1 faces the back surface 10S1. The head 15-1 writes data to the back surface 10S1 and reads the data from the back surface 10S1. The head 15-2 faces the front surface 10S2. The head 15-2 writes data to the front surface 10S2 and reads the data from the front surface 10S2. The head 15-3 faces the back surface 10S3. The head 15-3 writes data to the back surface 10S3 and reads the data from the back surface 10S3. The head 15-(N−1) faces the front surface 10S(N−1). The head 15-(N−1) writes data to the front surface 10S(N−1) and reads the data from the front surface 10S(N−1). The head 15-N faces the back surface 10SN. The head 15-N writes data to the back surface 10SN and reads the data from the back surface 10SN.

The driver IC 20 controls driving of the SPM 12 and the VCM 14 according to control of the system controller 130 (specifically, an MPU 60 to be described later).

The head amplifier IC (preamplifier) 30 includes a read amplifier and a write driver. The read amplifier amplifies a read signal read from the disk 10 and outputs the amplified read signal to the system controller 130 (specifically, a read/write (R/W) channel 40 to be described later). The write driver outputs a write current corresponding to the signal output from the R/W channel 40 to the head 15.

The volatile memory 70 is a semiconductor memory in which stored data is lost when power supply is cut off. The volatile memory 70 stores data necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when the power supply is cut off. The nonvolatile memory 80 is, for example, a NOR or NAND flash read only memory (ROM) (FROM).

The buffer memory 90 is a semiconductor memory that temporarily records data transmitted and received between the magnetic disk device 1 and the host system 100. The buffer memory 90 may be configured integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is realized by using, for example, a large-scale integrated circuit (LSI) called a system-on-a-chip (SoC) in which a plurality of elements are integrated on a single chip. The system controller 130 includes the R/W channel 40, a hard disk controller (HDC) 50, and a microprocessor or a microprocessing unit (MPU) 60. The system controller 130 is electrically connected to, for example, the driver IC 20, the head amplifier IC 30, the volatile memory 70, the nonvolatile memory 80, the buffer memory 90, the host system 100, and the like.

The R/W channel 40 executes signal processing of data (hereinafter, it may be referred to as read data) transferred from the disk 10 to the host system 100 and data (hereinafter, it may be referred to as write data) transferred from the host system 100 according to an instruction from the MPU 60 to be described later. The R/W channel 40 has a circuit or a function of modulating write data. The R/W channel 40 has a circuit or a function of measuring a signal quality of the read data and demodulating the signal. The R/W channel 40 is electrically connected to, for example, the head amplifier IC 30, the HDC 50, the MPU 60, and the like.

The HDC 50 controls data transfer. For example, the HDC 50 controls data transfer between the host system 100 and the disk 10 in response to an instruction from the MPU 60 to be described later. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 via the driver IC 20 to execute servo control for positioning the head 15. The MPU 60 controls the SPM 12 via the driver IC 20 to rotate the disk 10. The MPU 60 controls write-operation of data to the disk 10 and selects a storage destination of data transferred from the host system 100, for example, write data. Furthermore, the MPU 60 controls read-operation of data from the disk 10, and controls processing of data transferred from the disk 10 to the host system 100, for example, read data. Furthermore, the MPU 60 manages a region in which data is recorded. The MPU 60 is connected to each unit of the magnetic disk device 1. The MPU 60 is electrically connected to, for example, the driver IC 20, the R/W channel 40, the HDC 50, and the like.

The MPU 60 includes a read/write control unit 610, a parity data management unit 620, an error correction unit 630, a DDOL control unit 640, and a slip processing unit 650. The MPU 60 executes, on firmware, processing of each unit, for example, the read/write control unit 610, the parity data management unit 620, the error correction unit 630, the DDOL control unit 640, the slip processing unit 650, and the like. The MPU 60 may include each unit as a circuit, for example, the read/write control unit 610, the parity data management unit 620, the error correction unit 630, the DDOL control unit 640, the slip processing unit 650, and the like. The read/write control unit 610, the parity data management unit 620, the error correction unit 630, the DDOL control unit 640, and the slip processing unit 650 may be included in the R/W channel 40 or the HDC 50.

The read/write control unit 610 controls read processing of reading data from the disk 10 and write processing of writing data to the disk 10 according to a command or the like from the host system 100. The read/write control unit 610 controls the VCM 14 via the driver IC 20, positions the head 15 at a predetermined position on the disk 10, and executes read processing or write processing. Hereinafter, the term "access" may be used in the meaning including recording or writing data in a predetermined region (write processing), reading out or reading data from a predetermined region (read processing), or moving the head 15 to a predetermined region.

The read/write control unit 610 writes data to each predetermined region of the disk 10 according to a command or the like from the host system 100 in a shingled recording (shingled magnetic recording (SMR) or shingled write recording (SWR)) mode in which a track to be written next is overwritten on a part of a predetermined track in the radial direction. Hereinafter, "writing data in a shingled magnetic recording mode" may be simply expressed as "performing shingled magnetic recording", "executing shingled magnetic recording processing", or simply "writing". A unit of a region, in which shingled magnetic recording of data is performed, may be referred to as a band (or band region). The read/write control unit 610 sequentially performs shingled magnetic recording of a plurality of tracks on the band region. The read/write control unit 610 may write data to a predetermined region of the disk 10 according to a command or the like from the host system 100 in a conventional magnetic recording (CMR) mode in which a track radially adjacent to a predetermined track (hereinafter, it may be referred to as an adjacent track) or a sector radially adjacent to a predetermined sector (hereinafter, it may be referred to as an adjacent sector) is written at predetermined intervals (gaps) in the radial direction from the predetermined track or the predetermined sector or data can be written randomly. Hereinafter, "writing data in a conventional magnetic recording mode" may be simply expressed as "performing conventional magnetic recording", "executing conventional magnetic recording processing", or simply "writing".

Figure 3:
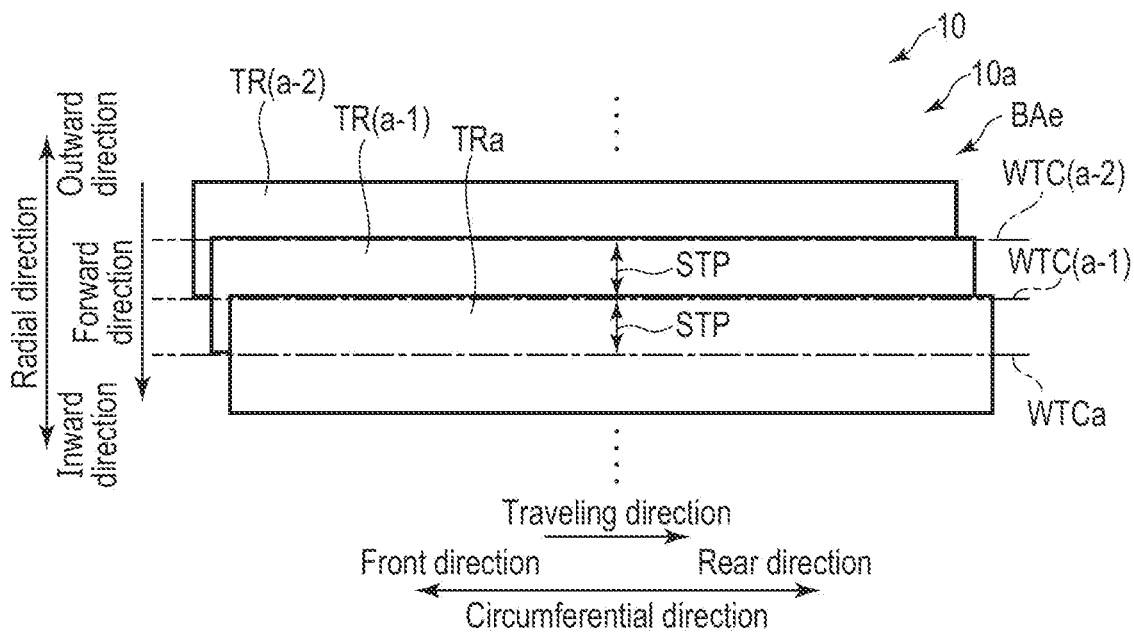
FIG. 3 is a schematic diagram illustrating an example of shingled magnetic recording processing.

FIG. 3 is a schematic diagram illustrating an example of shingled magnetic recording processing. FIG. 3 illustrates a traveling direction. As shown in FIG. 3, a direction in which the head 15 sequentially writes and reads data with respect to the disk 10 in the circumferential direction, that is, a direction in which the head 15 travels with respect to the disk 10 in the circumferential direction may be referred to as a traveling direction. For example, the traveling direction is opposite to the rotation direction of the disk 10. The traveling direction may be the same as the rotation direction of the disk 10. In the circumferential direction, a direction of a tip of an arrow in the traveling direction may be referred to as a rear direction or rear. In the circumferential direction, a direction opposite to the rear direction may be referred to as a front direction or front. FIG. 3 illustrates a forward direction. A direction in which a plurality of tracks are continuously subjected to shingled magnetic recording in the radial direction, that is, a direction in which a track to be written next overlaps a track written one ahead in the radial direction may be referred to as a forward direction. In FIG. 3, the inward direction is the forward direction in the radial direction, but the outward direction may be the forward direction.

FIG. 3 illustrates a band region BAe. In the band region BAe of FIG. 3, a plurality of tracks TR(a−2), TR(a−1), and TRa are continuously overwritten in the forward direction in the described order. FIG. 3 illustrates a track center WTC(a−2) of the track TR(a−2) at the time of writing the track TR(a−2), a track center WTC(a−1) of the track TR(a−1) at the time of writing the track TR(a−1), and a track center WTCa of the track TRa at the time of writing the track TRa. In the example illustrated in FIG. 3, the tracks TR(a−2), TR(a−1), and TRa are written at a track pitch STP. The track center WTC(a−2) of the track TR(a−2) and the track center WTC(a−1) of the track TR(a−1) are separated by the track pitch STP. The track center WTC(a−1) of the track TR(a−1) and the track center WTCa of the track TRa are separated by the track pitch STP. The tracks TR(a−2) to TRa may be written at a different track pitch. In FIG. 3, a radial width of a region in which the track TR(a−1) is not overwritten on the track TR(a−2) is the same as a radial width of a region in which the track TRa is not overwritten on the track TR(a−1). The radial width of the region in which the track TR(a−1) is not overwritten on the track TR(a−2) may be different from the radial width of the region in which the track TRa is not overwritten on the track TR(a−1). In FIG. 3, for convenience of description, each track is illustrated in a rectangular shape extending in the circumferential direction with a predetermined track width, but is actually curved along the circumferential direction. Furthermore, each track may have a wave shape extending in the circumferential direction while varying in the radial direction. In FIG. 3, three tracks are overwritten in the band region BAe, but less than three tracks or more than three tracks may be overwritten.

In the example illustrated in FIG. 3, the read/write control unit 610 sequentially performs shingled magnetic recording of the tracks TR(a−2) to TRa at the track pitch STP in the inward direction in the band region BAe. The read/write control unit 610 may sequentially perform the shingled magnetic recording of the tracks TR(a−2) to TRa at the track pitch STP in the outward direction. The read/write control unit 610 writes the track TR(a−1) at the track pitch STP in the inward direction of the track TR(a−2), and overwrites the track TR(a−1) on a part of the track TR(a−2) in the inward direction. The read/write control unit 610 writes the track TRa at the track pitch STP in the inward direction of the track TR(a−1), and overwrites the track TRa on a part of the track TR(a−1) in the inward direction.

Figure 4:
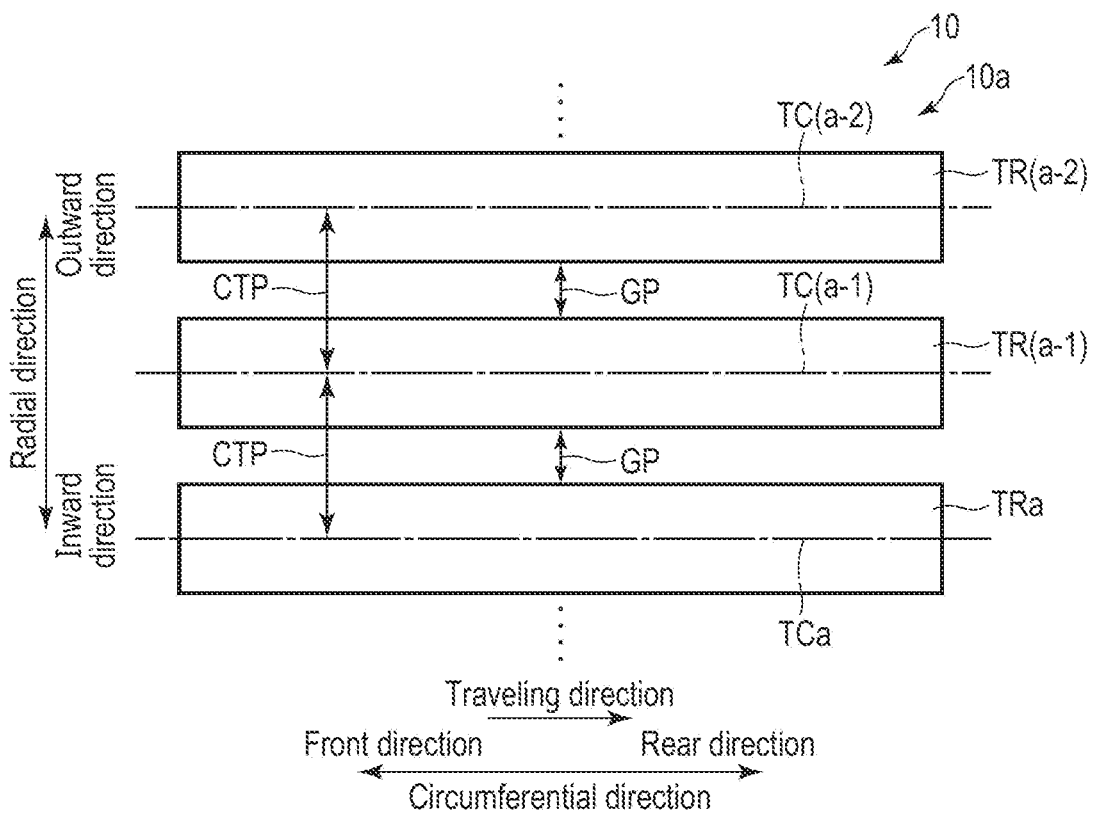
FIG. 4 is a schematic diagram illustrating an example of conventional magnetic recording processing.

FIG. 4 is a schematic diagram illustrating an example of the conventional magnetic recording processing. FIG. 4 illustrates the tracks TR(a−2), TR(a−1), and TRa. In FIG. 4, for example, the track widths of the tracks TR(a−2), TR(a−1), and TRa are the same. The track widths of the tracks TR(a−2) to TRa may be different. FIG. 4 illustrates a track center TC(a−2) of the track TR(a−2), a track center TC(a−1) of the track TR(a−1), and a track center TCa of the track TRa. In the example illustrated in FIG. 4, the tracks TR(a−2), TR(a−1), and TRa are written at a track pitch CTP. The track center TC(a−2) of the track TR(a−2) and the track center TC(a−1) of the track TR(a−1) are separated by the track pitch CTP. The track center TC(a−1) of the track TR(a−1) and the track center TCa of the track TRa are separated by the track pitch CTP. The track TR(a−2) and the track TR(a−1) are separated by a gap GP. The track TR(a−1) and the track TRa are separated by the gap GP. The tracks TR(a−2) to TRa may be written at a different track pitch. In FIG. 4, for convenience of description, each track is illustrated in a rectangular shape extending in the circumferential direction with a predetermined track width, but is actually curved along the circumferential direction. Furthermore, each track may have a wave shape extending in the circumferential direction while varying in the radial direction.

In the example illustrated in FIG. 4, the read/write control unit 610 positions the head 15 at the track center TC(a−2) in a predetermined region of the disk 10, for example, the user data region 10a, and normally records the track TR(a−2) or a predetermined sector of the track TR(a−2). The read/write control unit 610 positions the head 15 at the track center TC(a−1) separated at the track pitch CTP in the inward direction from the track center TC(a−2) of the track TR(a−2) in the user data region 10a, and normally records the track TR(a−1) or a predetermined sector of the track TR(a−1). The read/write control unit 610 positions the head 15 at the track center TCa separated at the track pitch CTP in the inward direction from the track center TC(a−1) of the track TR(a−1) in the user data region 10a, and normally records the track TRa or a predetermined sector of the track TRa. The read/write control unit 610 may normally record the tracks TR(a−2), TR(a−1), and TRa sequentially in a predetermined region of the disk 10, for example, the user data region 10a, and may normally record the tracks TR(a−2), TR(a−1), and TRa randomly in a predetermined sector of the track TR(a−2), a predetermined sector of the track TR(a−1), and a predetermined sector of the track TRa.

The parity data management unit 620 manages an XOR operation value (hereinafter, referred to as parity data or an operation value) acquired by an exclusive OR (XOR) operation. For example, the parity data management unit 620 executes an XOR operation on data transferred from the host system 100 or data read from the disk 10, and acquires parity data as a result of the XOR operation. The parity data management unit 620 writes the parity data to a predetermined sector of a predetermined track of the disk 10, for example, a parity sector (parity region PA) via the read/write control unit 610.

In one example, the parity data management unit 620 executes the XOR operation on data of all the sectors, which are read from the predetermined track or written to the predetermined track, and writes the parity data acquired as a result of the XOR operation on the data of all the sectors to the parity sector of this track.

The parity data management unit 620 may execute the XOR operation on data of all the sectors, which are read from the predetermined track or written to the predetermined track, and record or store the parity data acquired as a result of the XOR operation on the data of all the sectors in a predetermined recording region different from this track or an alternative region, for example, the disk 10, the volatile memory 70, the nonvolatile memory 80, or the buffer memory 90.

The parity data management unit 620 may execute the XOR operation on data for each of some sectors of all the sectors of the predetermined track and write the parity data acquired as a result of the XOR operation on the data of some sectors to the parity sector of this track.

Furthermore, the parity data management unit 620 may execute the XOR operation on data of each of some sectors of all the sectors of the predetermined track, and record or store the parity data acquired as a result of the XOR operation on the data of some sectors in the predetermined recording region or the alternative region, for example, the disk 10, the volatile memory 70, the nonvolatile memory 80, or the buffer memory 90.

For example, when writing data over one cycle of the predetermined track, the parity data management unit 620 writes the parity data by using a sector different from a servo sector located immediately before a sector to which data is initially written (hereinafter, it may be referred to as a start sector) as a parity sector. In other words, for example, when writing data over one cycle of the predetermined track, the parity data management unit 620 writes the parity data by using a sector different from a servo sector located immediately after a sector to which data is finally written (hereinafter, it may be referred to as a final sector) as a parity sector.

The parity data management unit 620 writes the parity data corresponding to each track of the disk 10 to each parity sector corresponding to each track. The parity data management unit 620 may manage whether or not the parity data or the parity sector is valid with a table or the like.

The error correction unit 630 recovers (corrects, relieves, or performs error correction on) data that cannot be read (hereinafter, it may be referred to as read error data or error data) or a sector that cannot be read (hereinafter, it may be referred to as a read error sector or an error sector). The error correction unit 630 executes processing (read retry) of reading error data or an error sector a plurality of times. Furthermore, the error correction unit 630 executes processing of correcting an error of data or an error of a sector based on an error correction code (hereinafter, it may be referred to as ECC processing or error correction processing). The error correction unit 630 executes the ECC processing (hereinafter, it may be referred to as sector ECC processing) on the error sector based on an ECC corresponding to error data of the predetermined track or an error sector of the predetermined track (hereinafter, it may be referred to as a sector ECC). The error correction unit 630 executes the ECC processing (hereinafter, it may be referred to as track ECC processing) on the error sector based on an ECC corresponding to error data of the predetermined track or the error sector of the predetermined track (hereinafter, it may be referred to as a track ECC). For example, based on the parity data or the parity sector which corresponds to the predetermined track, the error correction unit 630 performs track ECC processing on an error sector of the track. For example, the error correction unit 630 may record information related to the error sector (hereinafter, it may be referred to as error sector information) as a table in the predetermined recording region, for example, the disk 10, the volatile memory 70, or the nonvolatile memory 80.

The DDOL control unit 640 controls a region target position of a target region (hereinafter, it may be referred to as a target region) of the disk 10, for example, a distance or a shift amount in the radial direction from the center of the predetermined region, or a drift of level (DOL) which is an upper limit value of an approach amount from the region target position to a target position of a region located in the radial direction of the target region (hereinafter, it may be referred to as a radial region) (hereinafter, it may be referred to as a radial region target position). The DDOL control unit 640 controls (or sets) a track target position of the predetermined track of the disk 10, for example, a DOL which is an upper limit value of a shift amount in the radial direction from the track center (hereinafter, it may be referred to as a position error, a position error signal (PES), an off-track amount, or a squeeze amount). Hereinafter, the "distance or shift amount in the radial direction from the region target position" or the "approach amount from the region target position to the radial region target position" may be referred to as a "squeeze amount". The "shift in the radial direction from the region target position" or the "approach from the region target position to the radial region target position" may be referred to as "squeeze". "Each position error, each PES, each squeeze amount, or each off-track amount, which corresponds to each sector or each circumferential position in the predetermined track", a "change in each position error, each PES, each squeeze amount, or each off-track amount, which corresponds to each sector or each circumferential position in the predetermined track", or a "track of the change in each position error, each PES, each squeeze amount, or each off-track amount, which corresponds to each sector or each circumferential position in the predetermined track" may be simply referred to as "position error, a PES, a squeeze amount, or an off-track amount". "Each DOL corresponding to each sector or each circumferential position in the predetermined track", a "change in each DOL corresponding to each sector or each circumferential position in the predetermined track", or a "track of the change in each DOL corresponding to each sector or each circumferential position in the predetermined track" may be simply referred to as a DOL.

Based on the position error, the PES, the squeeze amount, or the off-track amount, which corresponds to an adjacent track of the predetermined track, the DDOL control unit 640 controls (or sets) the DOL or the DDOL corresponding to this track. Based on the position error, the PES, the squeeze amount, or the off-track amount, which corresponds to the adjacent track of the predetermined track, a function of controlling the DOL corresponding to this track may be referred to as a dynamic drift-off (DDOL) function or a DDOL. Furthermore, the DOL corresponding to this track controlled or set based on the position error, the PES, the squeeze amount, or the off-track amount, which corresponds to the adjacent track of the predetermined track, may be referred to as a DDOL.

The DDOL control unit 640 controls (or sets) the DDOL (hereinafter, it may be referred to as a current DDOL) or the DOL (hereinafter, it may be referred to as a current DOL), which corresponds to a track before being currently written (hereinafter, it may be referred to as a current track) based on the position error, the PES, the squeeze amount, or the off-track amount (hereinafter, it may be referred to as a previous position error, a previous PES, a previous squeeze amount, or a previous off-track amount) corresponding to an adjacent track written previously, for example, one ahead (hereinafter, it may be referred to as a previous track or a previous adjacent track). In other words, the DDOL control unit 640 controls (or sets) each current DOL (current DDOL) corresponding to each sector of the current track (hereinafter, it may be referred to as a current sector) based on each previous position error, each previous PES, each previous squeeze amount, or each previous off-track amount, which corresponds to each sector of the previous track (hereinafter, it may be referred to as a previous sector).

Furthermore, the DDOL control unit 640 may control (or set) a DDOL (hereinafter, it may be referred to as a next DDOL) or a DOL (hereinafter, it may be referred to as a next DOL), which corresponds to a track which is to be written next and adjacent to the current track in the radial direction, for example, in the forward direction (hereinafter, it may be referred to as a next track) based on the position error, the PES, the squeeze amount, or the off-track amount, which corresponds to the current track (hereinafter, it may be referred to as a current position error, a current PES, a current squeeze amount, or a current off-track amount). In other words, the DDOL control unit 640 may control (or set) each next DOL (next DDOL) corresponding to each sector of the next track (hereinafter, it may be referred to as a next sector) based on each current position error, each current PES, each current squeeze amount, or each current off-track amount, which corresponds to each current sector of the current track.

In a case where it is determined that the position error, the PES, the squeeze amount, or the off-track amount exceeds the DDOL (or equal to or greater than the DDOL), the DDOL control unit 640 interrupts (stops or prohibits) the write processing, waits for a rotation, and restarts the write processing from this predetermined circumferential position. The "processing of stopping the write processing, waiting for the rotation, and restarting the write processing in a case where the position error, the PES, the squeeze amount, or the off-track amount exceeds the DDOL" may also be referred to as "retry processing".

For example, in a case where it is determined that the current position error, the current PES, the current squeeze amount, or the current off-track amount exceeds the current DDOL (or equal to or greater than the DDOL) in a predetermined current sector of the current track, the DDOL control unit 640 interrupts (stops or prohibits) the write processing on the current track, waits for the rotation, and executes the retry processing from the circumferential position. In other words, in a case where it is determined that the current squeeze amount in the predetermined current sector exceeds the current DOL corresponding to this sector, the DDOL control unit 640 interrupts the write processing to the current sector disposed after the predetermined current sector, waits for the rotation, and executes the retry processing from this current sector.

The DDOL control unit 640 controls or sets a threshold value (hereinafter, it may be referred to as an unrecoverable threshold value) at which a read error occurs or an error sector is generated in a radial region of the target region when the position error, the PES, the squeeze amount, or the off-track amount, which corresponds to the target region, exceeds the threshold value.

The DDOL control unit 640 controls or sets an unrecoverable threshold value based on the DDOL. Based on the DDOL corresponding to the predetermined track, the DDOL control unit 640 controls or sets an unrecoverable threshold value corresponding to this track. In other words, based on each DOL (DDOL) corresponding to each sector of the predetermined track, the DDOL control unit 640 controls or sets each unrecoverable threshold value corresponding to each sector of this track. Hereinafter, "each unrecoverable threshold value corresponding to each sector or each circumferential position in the predetermined track", a "change in each unrecoverable threshold value corresponding to each sector or each circumferential position in the predetermined track", or a "track of the change in each unrecoverable threshold value corresponding to each sector or each circumferential position in the predetermined track" may be simply referred to as an "unrecoverable threshold value". The DDOL control unit 640 may control or set an unrecoverable threshold value based on the position error, the PES, the squeeze amount, or the off-track amount.

Based on the current DDOL corresponding to the current track, the DDOL control unit 640 controls or sets an unrecoverable threshold value corresponding to the current track (hereinafter, it may be referred to as a current unrecoverable threshold value). In other words, based on each current DOL (current DDOL) corresponding to each current sector of the current track, the DDOL control unit 640 controls or sets each current unrecoverable threshold value corresponding to each current sector of the current track.

In a case where shingled magnetic recording of data in a predetermined band region is performed, the current unrecoverable threshold value corresponds to a threshold value that causes a read error to occur or causes an error sector to be generated in a previous track adjacent in a reverse forward direction of the current track.

A shape of the current unrecoverable threshold value may be the same as a shape of the previous position error, previous PES, previous squeeze amount, or previous off-track amount in the previous track. The shape of the current unrecoverable threshold value may be different from the shape of the previous position error, previous PES, previous squeeze amount, or previous off-track amount in the previous track.

The shape of the current unrecoverable threshold value corresponding to the current track may be the same as a shape of the current DDOL corresponding to the current track. The shape of the current unrecoverable threshold value corresponding to the current track may be different from the shape of the current DDOL corresponding to the current track.

The current unrecoverable threshold value corresponding to the current track may be smaller than the current DDOL corresponding to the current track. In other words, in the current unrecoverable threshold value corresponding to the current track, the track target position of the current track, for example, the distance from the track center or the shift amount is smaller than the current DDOL corresponding to the current track.

Based on the next DDOL corresponding to the next track, the DDOL control unit 640 may control or set an unrecoverable threshold value corresponding to the next track (hereinafter, it may be referred to as a next unrecoverable threshold value). In other words, based on each next DOL (next DDOL) corresponding to each next sector of the next track, the DDOL control unit 640 may control or set each next unrecoverable threshold value corresponding to each next sector of the next track.

In a case where shingled magnetic recording of data in the predetermined band region is performed, the next unrecoverable threshold value corresponds to a threshold value that causes a read error to occur or causes an error sector to be generated in the current track.

A shape of the next unrecoverable threshold value may be the same as a shape of the current position error, current PES, current squeeze amount, or current off-track amount in the current track. The shape of the next unrecoverable threshold value may be different from the shape of the current position error, current PES, current squeeze amount, or current off-track amount in the current track.

A shape of the next unrecoverable threshold value corresponding to the next track may be the same as a shape of the next DDOL corresponding to the next track. The shape of the next unrecoverable threshold value corresponding to the next track may be different from the shape of the next DDOL corresponding to the next track.

The next unrecoverable threshold value corresponding to the next track may be smaller than the next DDOL corresponding to the next track. In other words, in the next unrecoverable threshold value corresponding to the next track, the track target position of the next track, for example, the distance from the track center or the shift amount is smaller than the next DDOL corresponding to the next track.

Based on the previous position error, previous PES, previous squeeze amount or previous off-track amount, and the next position error, next PES, next squeeze amount or next off-track amount, the DDOL control unit 640 may control, set, or calculate the current unrecoverable threshold value.

The DDOL control unit 640 counts the number of times at which the position error, the PES, the squeeze amount or the off-track amount exceeds the unrecoverable threshold value or the number of times at which the position error, the PES, the squeeze amount or the off-track amount becomes equal to or greater than the unrecoverable threshold value (hereinafter, it may be referred to as the excessive number of times of unrecoverable threshold value). For example, in a case where the position error, the PES, the squeeze amount, or the off-track amount exceeds the unrecoverable threshold value or is equal to or greater than the unrecoverable threshold value, the DDOL control unit 640 counts the number of times by increasing the excessive number of times of unrecoverable threshold value by one.

The DDOL control unit 640 counts the excessive number of times of unrecoverable threshold value corresponding to the predetermined track. For example, in a case where the position error, the PES, the squeeze amount, or the off-track amount, which corresponds to the predetermined track, exceeds the unrecoverable threshold value corresponding to the predetermined track or is equal to or greater than the unrecoverable threshold value, the DDOL control unit 640 counts the number of times by increasing the excessive number of times of unrecoverable threshold value corresponding to the predetermined track by one. In other words, in a case where the position error, the PES, the squeeze amount, or the off-track amount, which corresponds to the predetermined sector of the predetermined track, exceeds the unrecoverable threshold value corresponding to this sector or is equal to or greater than the unrecoverable threshold value, the DDOL control unit 640 counts the number of times by increasing the excessive number of times of unrecoverable threshold value corresponding to the predetermined track by one.

The DDOL control unit 640 counts the excessive number of times of unrecoverable threshold value corresponding to the current track (hereinafter, it may be referred to as the current excessive number of times of unrecoverable threshold value). For example, in a case where the current position error, the current PES, the current squeeze amount, or the current off-track amount exceeds the current unrecoverable threshold value or is equal to or greater than the current unrecoverable threshold value, the DDOL control unit 640 counts the number of times by increasing the current excessive number of times of unrecoverable threshold value by one. In other words, in a case where the current position error, the current PES, the current squeeze amount, or the current off-track amount, which corresponds to the predetermined current sector of the current track, exceeds the current unrecoverable threshold value corresponding to this current sector or is equal to or greater than the current unrecoverable threshold value, the DDOL control unit 640 counts the number of times by increasing the current excessive number of times of unrecoverable threshold value corresponding to this track by one.

The DDOL control unit 640 counts, for each servo sector, the excessive number of times of unrecoverable threshold value. For example, in a sector to which user data between two servo sectors continuously arranged in the circumferential direction is written, in a case where the position error, the PES, the squeeze amount, or the off-track amount exceeds the unrecoverable threshold value a plurality of times, the DDOL control unit 640 may count the number of times by increasing the excessive number of times of unrecoverable threshold value by only one.

Every time the excessive number of times of unrecoverable threshold value is increased in the predetermined track, the DDOL control unit 640 adjusts a DDOL corresponding to the predetermined track (hereinafter, it may be referred to as a DDOL before tightening). In order to separate the DDOL corresponding to a track from the track adjacent to the predetermined track, the DDOL control unit 640 gradually tightens the DDOL before tightening which corresponds to the track every time the excessive number of times of unrecoverable threshold value increases in the predetermined track. In other words, every time the position error, the PES, the squeeze amount, or the off-track amount in the predetermined track exceeds the unrecoverable threshold value corresponding to this track, the DDOL control unit 640 gradually tightens the DDOL before tightening which corresponds to this track.

Every time the current excessive number of times of unrecoverable threshold value is increased in the current track, the DDOL control unit 640 adjusts the DDOL before tightening corresponding to the current track (hereinafter, it may be referred to as a current DDOL before tightening). In order to separate the DDOL corresponding to a current track from a track adjacent to the current track, for example, a previous track or a next track, every time the current excessive number of times of unrecoverable threshold value increases in the current track, the DDOL control unit 640 gradually tightens the current DDOL before tightening which corresponds to this track. In other words, every time the current position error, the current PES, the current squeeze amount, or the current off-track amount in the current track exceeds the unrecoverable threshold value corresponding to the current track, the DDOL control unit 640 gradually tightens the DDOL before tightening which corresponds to the current track.

In a case where the position error, the PES, the squeeze amount, or the off-track amount in a plurality of sectors of the predetermined track exceeds the unrecoverable threshold value corresponding to this track, the DDOL before tightening changes inversely proportional to the excessive number of times of unrecoverable threshold value. For example, a change amount of the DDOL before tightening in a case where the position error, the PES, the squeeze amount, or the off-track amount in the predetermined sector of the predetermined track exceeds the unrecoverable threshold value corresponding to this track is greater than a change amount of the DDOL before tightening in a case where the position error, the PES, the squeeze amount, or the off-track amount exceeds the unrecoverable threshold value corresponding to this track in a sector after the predetermined sector of the predetermined track.

The DDOL control unit 640 may acquire a maximum value or a minimum value of each position error, each PES, each squeeze amount, or each off-track amount, which corresponds to the excessive number of times of unrecoverable threshold value every time the excessive number of times of unrecoverable threshold value is counted (or increased) in the predetermined track, and record or hold the maximum value or the minimum value in the predetermined recording region, for example, the disk 10, the volatile memory 70, the nonvolatile memory 80, or the buffer memory 90.

The DDOL control unit 640 may calculate an average value of all the position errors, all the PESs, all the squeeze amounts, or all the off-track amounts, which respectively corresponds to all the excessive number of times of unrecoverable threshold value every time the excessive number of times of unrecoverable threshold value is counted (or increased), and record or hold the average value in the predetermined recording region, for example, the disk 10, the volatile memory 70, the nonvolatile memory 80, or the buffer memory 90.

The DDOL control unit 640 may acquire a maximum value or a minimum value of all the position errors, all the PESs, all the squeeze amounts, or all the off-track amounts, which respectively corresponds to all the excessive number of times of unrecoverable threshold value every time the excessive number of times of unrecoverable threshold value is counted (or increased), and record or hold the maximum value or the minimum value in the predetermined recording region, for example, the disk 10, the volatile memory 70, the nonvolatile memory 80, or the buffer memory 90.

Hereinafter, the "average value, the maximum value, or the minimum value of each position error, each PES, each squeeze amount or each off-track amount, which corresponds to the excessive number of times of unrecoverable threshold value and is defined for the excessive number of times of unrecoverable threshold value" may be referred to as a "tightening determination value".

In a sector to which the user data between two servo sectors continuously arranged in the circumferential direction is written, in a case where the position error, the PES, the squeeze amount, or the off-track amount exceeds the unrecoverable threshold value a plurality of times, the DDOL control unit 640 may acquire a worst value of a plurality of the position errors, a plurality of the PESs, a plurality of the squeeze amounts, or a plurality of the off-track amounts, which exceed a predetermined unrecoverable threshold value, for example, a greatest value or a smallest value, as the position error, the PES, the squeeze amount, or the off-track amount, which corresponds to the sector between two servo sectors.

The DDOL control unit 640 controls the write processing based on each tightening determination value corresponding to the excessive number of times of unrecoverable threshold value, which is defined for the excessive number of times of unrecoverable threshold value in the predetermined track, and a threshold value (hereinafter, it may be referred to as a tightening threshold value) which is smaller than a track ECC impossible threshold value at which error correction corresponding to the track cannot be performed and changes the write processing, for example, the DDOL. In other words, the DDOL control unit 640 controls the write processing based on each tightening determination value corresponding to an excess sector, which is defined for a sector in which the position error, the PES, the squeeze amount, or the off-track amount exceeds the unrecoverable threshold value in the predetermined track (hereinafter, it may be referred to as an excess sector) and the tightening threshold value corresponding to this track.

The DDOL control unit 640 determines whether each tightening determination value corresponding to the excessive number of times of unrecoverable threshold value, which is defined for the excessive number of times of unrecoverable threshold value in the predetermined track is equal to or greater than the tightening threshold value corresponding to this track or is smaller than the tightening threshold value (or is greater than the tightening threshold value or equal to or smaller than the tightening threshold value). In other words, the DDOL control unit 640 determines whether each tightening determination value corresponding to each excess sector, which is defined for the excess sector, in the predetermined track is equal to or greater than the tightening threshold value corresponding to this track or is smaller than the tightening threshold value (or is greater than the tightening threshold value or equal to or smaller than the tightening threshold value).

In a case where it is determined that the tightening determination value corresponding to the predetermined excessive number of times of unrecoverable threshold value is greater than the tightening threshold value or is equal to or greater than the tightening threshold value in the predetermined track, the DDOL control unit 640 stops the write processing such that the error sector is not generated any more and the track ECC processing cannot be executed, and adjusts, changes, sets, or shifts the DDOL before tightening corresponding to a position after the circumferential position corresponding to the predetermined excessive number of times of unrecoverable threshold value in the track to a DDOL (hereinafter, it may be referred to as DDOL after tightening) smaller than the DDOL before tightening and smaller than the unrecoverable threshold value. In other words, in a case where it is determined that the tightening determination value corresponding to a predetermined excess sector in the predetermined track is greater than the tightening threshold value or is equal to or greater than the tightening threshold value, the DDOL control unit 640 stops the write processing and changes the DDOL before tightening corresponding to a sector after the predetermined excess sector in this track to the DDOL after tightening.

A distance in the radial direction from the track target position of the predetermined track to the DDOL after tightening corresponding to this track is smaller than a distance in the radial direction from the track target position of this track to the DDOL before tightening corresponding to this track. Furthermore, a distance in the radial direction from the track target position of the predetermined track to the DDOL after tightening corresponding to this track is smaller than a distance in the radial direction from the track target position of this track to the unrecoverable threshold value corresponding to this track.

Hereinafter, "adjusting, changing, setting, or shifting from a DDOL before tightening to a DDOL after tightening" may be expressed as "tightening a DDOL before tightening to a DDOL after tightening" or "decreasing a DDOL before tightening to a DDOL after tightening". Furthermore, "tightening a DDOL" may be referred to as "DDOL tightening processing" or "tightening processing". The DDOL before tightening can be set discontinuously to the DDOL after tightening. The DDOL before tightening may be set continuously to the DDOL after tightening. In a case where it is determined that a correction determination value is equal to or smaller than a correction determination threshold value or smaller than the correction determination threshold value, the DDOL control unit 640 continues the write processing.

The slip processing unit 650 executes slip processing of shifting (or slipping) and writing at least one sector of the predetermined track.

The slip processing unit 650 shifts (or slips) at least one sector from the predetermined sector of the predetermined track of the predetermined band region to a final sector of this track, and sequentially performs writing in the traveling direction from a start sector of an adjacent track in the forward direction.

In a case where at least one sector from the predetermined sector of the predetermined track of the predetermined band region to a final sector of this track is shifted, and writing is sequentially performed in the traveling direction from a start sector of an adjacent track in the forward direction, the slip processing unit 650 may write parity data obtained by performing an XOR operation on at least one sector from the start sector of the predetermined track to a sector adjacent to the opposite side of the traveling direction of the predetermined sector to a parity sector of this track.

Furthermore, in a case where at least one sector from the predetermined sector of the predetermined track of the predetermined band region to a final sector of this track is shifted, and writing is sequentially performed in the traveling direction from a start sector of an adjacent track in the forward direction, the slip processing unit 650 may store at least one sector from the start sector of the predetermined track to a sector adjacent to the opposite side of the traveling direction of the predetermined sector in other recording regions, for example, the disk 10, the volatile memory 70, the nonvolatile memory 80, or the buffer memory 90.

The slip processing unit 650 shifts (or slips) at least one sector from the current sector of the current track of the predetermined band region to a final sector of this current track, and sequentially performs writing in the traveling direction from a start sector of a next track.

In a case where at least one sector from the current sector of the current track of the predetermined band region to a final sector of this current track is shifted, and writing is sequentially performed in the traveling direction from a start sector of a next track in the forward direction, the slip processing unit 650 may write parity data obtained by performing an XOR operation on at least one sector from the start sector of the current track to a sector adjacent to the opposite side of the traveling direction of the current sector in a parity sector of this current track.

Furthermore, in a case where at least one sector from the current sector of the current track of the predetermined band region to a final sector of this current track is shifted, and writing is sequentially performed in the traveling direction from a start sector of a next track in the forward direction, the slip processing unit 650 may store at least one sector from the start sector of the current track to a sector adjacent to the opposite side of the traveling direction of the current sector in other recording regions, for example, the disk 10, the volatile memory 70, the nonvolatile memory 80, or the buffer memory 90.

The slip processing unit 650 may shift (or slip) only at least one sector in which the DDOL after tightening corresponding to the predetermined track of the predetermined band region is smaller than a threshold value of a distance from this track to the DDOL after tightening (hereinafter, it may be referred to as a DDOL proximity threshold value) (or is equal to or smaller than the DDOL proximity threshold value), and perform sequentially writing in the traveling direction from a start sector of an adjacent track in the forward direction. In other words, the slip processing unit 650 may shift (or slip) only at least one sector in which the DDOL after tightening corresponding to the predetermined track of the predetermined band region is proximate to the DDOL proximity threshold value, and sequentially perform writing in the traveling direction from the start sector of the adjacent track in the forward direction.

In a case where only at least one sector in which the DDOL after tightening corresponding to the predetermined track of the predetermined band region is smaller than the DDOL proximity threshold value or is equal to or smaller than the DDOL proximity threshold value is shifted and writing is sequentially performed in the traveling direction from a start sector of an adjacent track in the forward direction, the slip processing unit 650 may write parity data obtained by performing an XOR operation on other sectors other than at least one sector, in which the DDOL after tightening corresponding to the predetermined track of the predetermined band region is smaller than the DDOL proximity threshold value (or is equal to or smaller than the DDOL proximity threshold value), to the parity sector of the predetermined track.

The slip processing unit 650 may shift (or slip) only at least one sector in which a current DDOL after tightening corresponding to the current track of the predetermined band region is smaller than the DDOL proximity threshold value corresponding to the current track (hereinafter, it may be referred to as a current DDOL proximity threshold value) (or is equal to or smaller than the current DDOL proximity threshold value), and perform writing sequentially in the traveling direction from a start sector of a next track in the forward direction.

In a case where only at least one sector, in which the current DDOL after tightening corresponding to the current track of the predetermined band region is smaller than the current DDOL proximity threshold value (or is equal to or smaller than the current DDOL proximity threshold value), is shifted and writing is sequentially performed in the traveling direction from a start sector of a next track in the forward direction, the slip processing unit 650 may write parity data obtained by performing an XOR operation on other sectors other than at least one sector, in which the current DDOL after tightening corresponding to the current track of the predetermined band region is smaller than the current DDOL proximity threshold value (or is equal to or smaller than the current DDOL proximity threshold value), to the parity sector of this current track in this current track.

The slip processing unit 650 counts the number of times at which the position error, the PES, the squeeze amount, or the off-track amount, which corresponds to the predetermined track, exceeds the DDOL after tightening corresponding to this track, or the number of times at which the position error, the PES, the squeeze amount, or the off-track amount becomes equal to or greater than the DDOL after tightening (hereinafter, it may be referred to as the excessive number of times after tightening).

The slip processing unit 650 counts the excessive number of times after tightening at which the current position error, the current PES, the current squeeze amount, or the current off-track amount, which corresponds to the current track, corresponds to this track (hereinafter, it may be referred to as the current excessive number of times after tightening).

In a case where it is determined that the excessive number of times after tightening corresponding to the predetermined track is greater than the predetermined number of times corresponding to this track (hereinafter, it may be referred to as an excessive threshold value after tightening) or is equal to or greater than the excessive threshold value after tightening, the slip processing unit 650 determines that write performance is deteriorated and the write processing is difficult, and executes the slip processing on this track.

In a case where it is determined that the current excessive number of times after tightening corresponding to the current track is greater than an excessive threshold value after tightening corresponding to this track (hereinafter, it may be referred to as a current excessive threshold value after tightening) or is equal to or greater than the current excessive threshold value after tightening, the slip processing unit 650 executes the slip processing on this track.

In a case where it is determined that the excessive number of times after tightening corresponding to the predetermined track is equal to or smaller than the excessive threshold value after tightening corresponding to this track or is smaller than the excessive threshold value after tightening, the slip processing unit 650 continues the write processing on this track.

In a case where it is determined that the current excessive number of times after tightening corresponding to the current track is equal to or smaller than the current excessive threshold value after tightening corresponding to this track or is smaller than the current excessive threshold value after tightening, the slip processing unit 650 continues the write processing on this track.

In a case where it is determined that in the predetermined sector of the predetermined track of the predetermined band region, the excessive number of times after tightening is greater than the excessive threshold value after tightening corresponding to this predetermined track or is equal to or greater than the excessive threshold value after tightening, the slip processing unit 650 shifts (or slips) at least one sector from this predetermined sector to a final sector of this predetermined track, and performs writing sequentially in the traveling direction from a start sector of an adjacent track in the forward direction.

In a case where it is determined that in the predetermined current sector of the current track of the predetermined band region, the current excessive number of times after tightening is greater than the current excessive threshold value after tightening corresponding to this current track or is equal to or greater than the current excessive threshold value after tightening, the slip processing unit 650 shifts (or slips) at least one sector from this current sector to a final sector of this current track, and performs writing sequentially in the traveling direction from the start sector of a next track.

In a case where it is determined that in the predetermined sector of the predetermined track of the predetermined band region, the excessive number of times after tightening is greater than the excessive threshold value after tightening corresponding to this predetermined track or is equal to or greater than the excessive threshold value after tightening, the slip processing unit 650 may shift (or slip) only at least one sector in which the DDOL after tightening is smaller than a predetermined DDOL proximity threshold value corresponding to the predetermined track (or equal to or smaller than the predetermined DDOL proximity threshold value), and perform writing sequentially in the traveling direction from a start sector of an adjacent track in the forward direction.

In a case where it is determined that in the predetermined current sector of the current track of the predetermined band region, the current excessive number of times after tightening is greater than the current excessive threshold value after tightening corresponding to this current track or is equal to or greater than the current excessive threshold value after tightening, the slip processing unit 650 may shift (or slip) only at least one sector in which the current DDOL after tightening is smaller than a current DDOL proximity threshold value corresponding to the current track (or equal to or smaller than the current DDOL proximity threshold value), and perform writing sequentially in the traveling direction from a start sector of a next track in the forward direction.

The slip processing unit 650 may stop the write processing, and select and perform the tightening processing or the slip processing in a case where it is determined that the tightening determination value is greater than the tightening threshold value or equal to or greater than the tightening threshold value.

Figure 5:
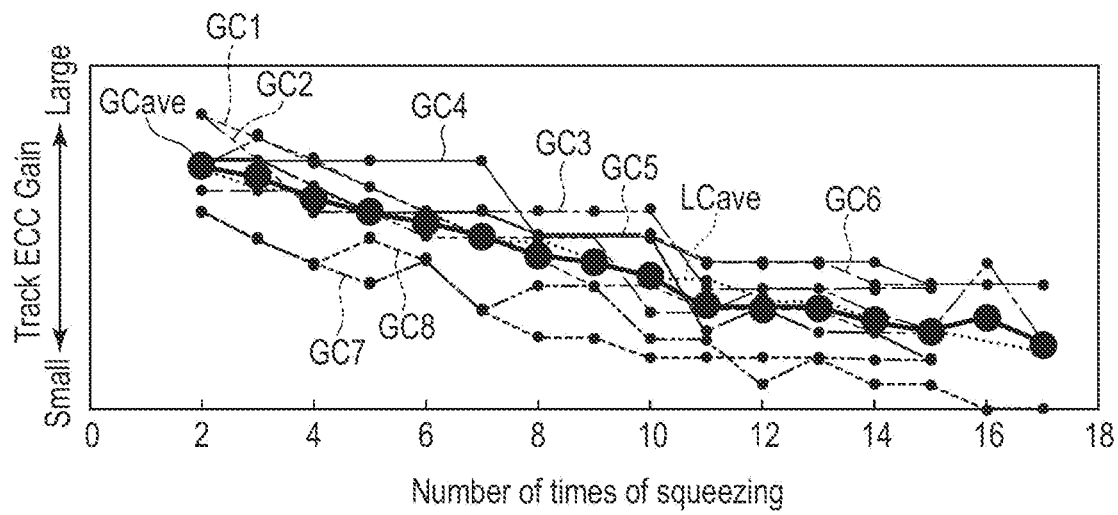
FIG. 5 is a schematic diagram illustrating an example of a change in track ECC gain for the number of times of squeezing.

FIG. 5 is a schematic diagram illustrating an example of a change in track ECC gain for the number of times of squeezing. In FIG. 5, a horizontal axis represents the number of sectors squeezed in the predetermined track (hereinafter, it may be referred to as the number of times of squeezing), and a vertical axis represents track ECC gain corresponding to a shift amount in the radial direction from a track target position correctable with the track ECC in the predetermined track. The horizontal axis may be the excessive number of times of unrecoverable threshold value. That is, the number of times of squeezing may correspond to the excessive number of times of unrecoverable threshold value. Furthermore, the vertical axis may be the tightening determination value. That is, the track ECC gain may correspond to the tightening determination value. In the vertical axis of FIG. 5, the track ECC gain increases as the track ECC gain advances to a tip side of a large-side arrow and decreases as the track ECC gain advances to a tip side of a small-side arrow. FIG. 5 illustrates changes GC1, GC2, GC3, GC4, GC5, GC6, GC7, and GC8 in the track ECC gain for the number of times of squeezing corresponding to each of a plurality of the heads 15 (hereinafter, it may be simply referred to as a change in track ECC gain). Furthermore, FIG. 5 illustrates a change GCave in the track ECC gain corresponding to each average value of the changes GC1 to GC8 in the track ECC gain for the number of times of squeezing, and a change LCave in the track ECC gain obtained by linearly interpolating each average value of the changes GC1 to GC8 in the track ECC gain for the number of times of squeezing. For example, in a case where the squeeze amount in the predetermined number of times of squeezing in the predetermined track is smaller than the change GCave in the track ECC gain, or is equal to or smaller than the change GCave in the track ECC gain, it is possible to correct an error sector generated in this track with the track ECC.

In the example illustrated in FIG. 5, the change GCave in the track ECC gain decreases as the number of times of squeezing increases. The change GCave in the track ECC gain can be approximated by a straight line in which the track ECC gain decreases as the number of times of squeezing increases. That is, as the number of times of squeezing, for example, the excessive number of times of unrecoverable threshold value increases, the correction determination value at which a read error that cannot be corrected by the track ECC processing may occur decreases.

Figure 6:
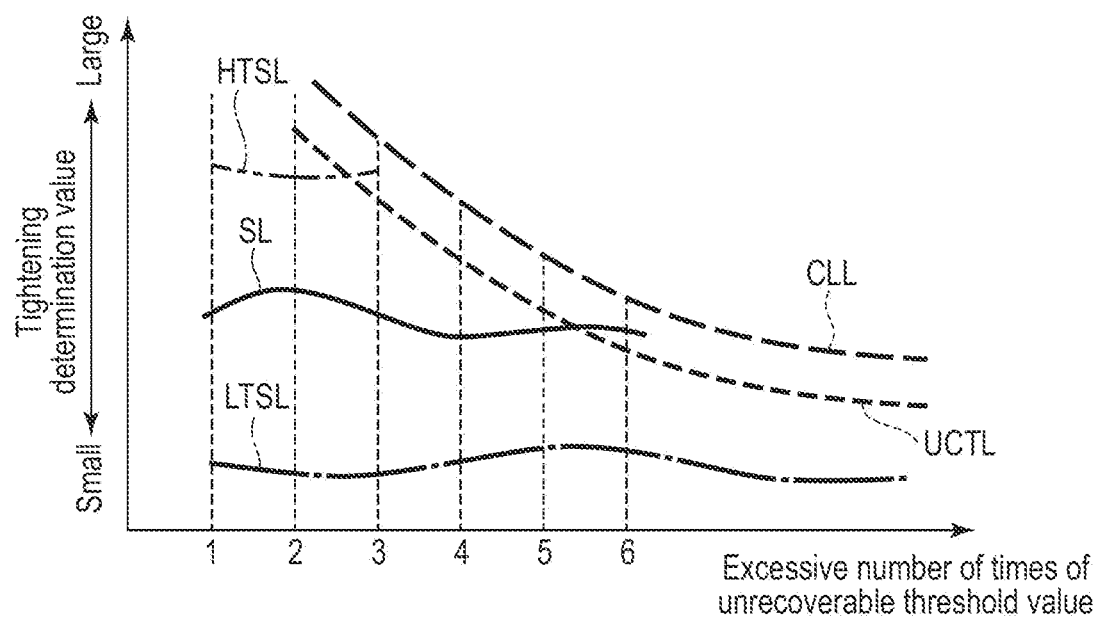
FIG. 6 is a schematic diagram illustrating an example of a change in a tightening determination value for an unrecoverable excessive threshold value according to the first embodiment.

FIG. 6 is a schematic diagram illustrating an example of a change in a tightening determination value with respect to the unrecoverable excessive threshold value according to the present embodiment. In FIG. 6, a horizontal axis represents the excessive number of times of unrecoverable threshold value in a predetermined track of a predetermined disk, and a vertical axis represents the tightening determination value in the predetermined track of the predetermined disk. In the horizontal axis of FIG. 6, the excessive number of times of unrecoverable threshold value increases as the excessive number of times of unrecoverable threshold value advances to a tip side of an arrow, and decreases as the excessive number of times of unrecoverable threshold value advances to a side opposite to the tip side of the arrow. The horizontal axis of FIG. 6 indicates the excessive number of times of unrecoverable threshold value of 1, 2, 3, 4, 5, and 6. In the vertical axis of FIG. 6, the tightening determination value increases as the tightening determination value advances to a tip side of a large-side arrow, and decreases as the tightening determination value advances to a tip side of a small-side arrow. FIG. 6 illustrates a change CLL in the track ECC impossible threshold value for the excessive number of times of unrecoverable threshold value (hereinafter, it may be simply referred to as a track ECC impossible threshold value) and a change UCTL in the tightening threshold value for the excessive number of times of unrecoverable threshold value (hereinafter, it may be simply referred to as a tightening threshold value). The track ECC impossible threshold value CLL is greater than the tightening threshold value UCTL. That is, the tightening threshold value UCTL is smaller than the track ECC impossible threshold value CLL. FIG. 6 illustrates a change SL (hereinafter, it may be simply referred to as a change in a target tightening determination value) in the tightening determination value for the excessive number of times of unrecoverable threshold value in the predetermined track of the disk 10 as a target (hereinafter, it may be referred to as a target disk), a change HTSL (hereinafter, it may be referred to as a change in a tightening determination value corresponding to a high TPI) in the tightening determination value in the predetermined track (hereinafter, it may be referred to as a high TPI track) of the disk 10 having a TPI higher than that of the target disk 10 (hereinafter, it may be referred to as a high TPI disk), and a change LTSL (hereinafter, it may be referred to as a change in a tightening determination value corresponding to a low TPI) in the tightening determination value in the predetermined track (hereinafter, it may be referred to as a low TPI track) of the disk 10 having a TPI lower than that of the target disk 10 (hereinafter, it may be referred to as a low TPI disk). The change SL in the target tightening determination value is smaller than the change HTSL in the tightening determination value corresponding to the high TPI. The change SL in the target tightening determination value is greater than the change LTSL in the tightening determination value corresponding to the low TPI.

In the example illustrated in FIG. 6, the change SL in the target tightening determination value reaches the tightening threshold value UCTL when the excessive number of times of unrecoverable threshold value is six.

In the example illustrated in FIG. 6, the change HTSL in the tightening determination value corresponding to the high TPI reaches the tightening threshold value UCTL when the excessive number of times of unrecoverable threshold value is three. That is, in the disk 10 having the high TPI, the tightening determination value for the excessive number of times of unrecoverable threshold value becomes greater than that of the target disk 10, and the tightening determination value may be reach the tightening threshold value with the excessive number of times of unrecoverable threshold value smaller than the excessive number of times of unrecoverable threshold value of the target disk 10.

In the example illustrated in FIG. 6, the change LTSL in the tightening determination value corresponding to the low TPI does not reach the tightening threshold value even when the excessive number of times of unrecoverable threshold value is more than six. That is, in the disk 10 having the low TPI, the tightening determination value for the excessive number of times of unrecoverable threshold value becomes smaller than that of the target disk 10, and the tightening determination value may be reach the tightening threshold value with the excessive number of times of unrecoverable threshold value greater than the excessive number of times of unrecoverable threshold value of the target disk 10.

FIG. 7 is a schematic diagram illustrating an example of the DDOL tightening processing according to the present embodiment. In FIG. 7, the tightening determination value corresponds to the change SL in the target tightening determination value in FIG. 6. FIG. 7 illustrates tracks TR(k−1) and TR(k). The tracks TR(k−1) and TR(k) are adjacent to each other in the radial direction. The tracks TR(k−1) and TR(k) may be disposed in the predetermined band region. FIG. 7 illustrates a track center TC(k−1) of the track TR(k−1) and a track center TC(k) of the track TR(k). FIG. 7 illustrates a PES PEC(k−1) corresponding to the track TR(k−1) and a PES PEC(k) corresponding to the track TR(k). FIG. 7 illustrates a DDOL before tightening DDC(k) corresponding to the track TR(k) and a DDOL after tightening DDC'(k) corresponding to the track TR(k). FIG. 7 illustrates an unrecoverable threshold value UT(k) corresponding to the track TR(k). FIG. 7 illustrates circumferential positions CP61 and CP62. The circumferential position CP61 corresponds to, for example, the predetermined sector, and the circumferential position CP62 corresponds to, for example, a sector adjacent in the traveling direction of a sector corresponding to the circumferential position CP61. The circumferential position CP61 corresponds to a circumferential position at which the PES PEC(k) exceeds the unrecoverable threshold value UT(k) at the fifth time. In other words, the excessive number of times of unrecoverable threshold value reaches five at the circumferential position CP61. The circumferential position CP62 corresponds to a circumferential position at which the PES PEC(k) exceeds the unrecoverable threshold value UT(k) at the sixth time. In other words, the excessive number of times of unrecoverable threshold value corresponding to the track TR(k) reaches six at the circumferential position CP62. For example, at the circumferential position CP62, the tightening determination value corresponding to the circumferential position CP62 of the track TR(k) is equal to or greater than the tightening threshold value corresponding to the track TR(k) (or greater than the tightening threshold value).

In the example illustrated in FIG. 7, the MPU 60 writes the track TR(k−1). When writing the track TR(k−1), the MPU 60 sets the DDOL DDC(k) corresponding to the track TR(k) based on the PES PEC(k−1) corresponding to the track TR(k−1). The MPU 60 sets the unrecoverable threshold value UT(k) corresponding to the track TR(k) based on the DDOL DDC(k) corresponding to the track TR(k).

In the example illustrated in FIG. 7, the MPU 60 writes the track TR(k) after the track TR(k−1). The MPU 60 may execute shingled writing of the track TR(k) on a part of the track TR(k−1) in the forward direction and in the radial direction. The MPU 60 writes the track TR(k) according to the PES PEC(k). When writing the track TR(k), the MPU 60 counts the excessive number of times of unrecoverable threshold value at the circumferential position CP61 as five. When writing the track TR(k), the MPU 60 counts the excessive number of times of unrecoverable threshold value at the circumferential position CP62 as six. When writing the track TR(k), the MPU 60 determines whether the tightening determination value is greater than the tightening threshold value or equal to or smaller than the tightening threshold value when the excessive number of times of unrecoverable threshold value reaches six at the circumferential position CP62. In a case where it is determined that the excessive number of times of unrecoverable threshold value reaches six at the time of writing the track TR(k) and the tightening determination value is equal to or greater than the tightening threshold value, the MPU 60 stops the write processing in the track TR(k), and tightens the DDOL before tightening DDC(k) to the DDOL after tightening DDC'(k) which is closer to the track center TC(k) than the unrecoverable threshold value UT(k), that is, smaller than the unrecoverable threshold value UT(k) such that error sectors are not generated in the track TR(k) any more. The DDOL after tightening DDC'(k) is discontinuous with the DDOL before tightening DDC(k). The MPU 60 retries the write processing of the track TR(k) from the circumferential position CP62.

FIG. 8 is a schematic diagram illustrating an example of a change in DDOL with respect to the excessive number of times of unrecoverable threshold value according to the present embodiment. FIG. 8 corresponds to FIGS. 6 and 7. In FIG. 8, a horizontal axis represents the excessive number of times of unrecoverable threshold value in the predetermined track, and a vertical axis represents DDOL in the predetermined track. In the horizontal axis of FIG. 8, the excessive number of times of unrecoverable threshold value increases as the excessive number of times of unrecoverable threshold value advances to a tip side of an arrow, and decreases as the excessive number of times of unrecoverable threshold value advances to a side opposite to the tip side of the arrow. The horizontal axis of FIG. 8 indicates the excessive number of times of unrecoverable threshold value of 1, 2, 3, 4, 5, and 6. In the vertical axis of FIG. 8, the DDOL increases as the DDOL advances to a tip side of a large-side arrow, and decreases as the DDOL advances to a tip side of a small-side arrow. FIG. 8 illustrates a change DC (hereinafter, it may be referred to as a change in a DDOL) in the DDOL for the excessive number of times of unrecoverable threshold value. The change DC in the DDOL includes a change BDC (hereinafter, it may be simply referred to as a DDOL before tightening) in the DDOL before tightening for the excessive number of times of unrecoverable threshold value and a DDOL after tightening ADC for the excessive number of times of unrecoverable threshold value (hereinafter, it may be simply referred to as a DDOL after tightening).

As illustrated in FIG. 8, the MPU 60 gradually tightens the DDOL before tightening BDC every time the excessive number of times of unrecoverable threshold value increases in the predetermined track. For example, the MPU 60 can make the DDOL before tightening BDC inversely proportional every time the excessive number of times of unrecoverable threshold value increases in the predetermined track. That is, in the DDOL before tightening, a change amount of the DDOL of a start sector of the predetermined track is greater than a change amount of the DDOL of a sector disposed in the traveling direction from the start sector of this track. In a case where it is determined that the tightening determination value is equal to or greater than the tightening threshold value when the excessive number of times of unrecoverable threshold value reaches six in the predetermined track, the MPU 60 stops the write processing for this track, and tightens the DDOL before tightening BDC to the DDOL after tightening ADC such that the error sector is not generated any more in this track. The MPU 60 may maintain the DDOL after tightening ADC constant. The MPU 60 may change the DDOL after tightening ADC.

FIG. 9 is a schematic diagram illustrating an example of a configuration of the track. FIG. 9 illustrates tracks TR(k) and TR(k+1). The track TR(k) corresponds to the track TR(k) illustrated in FIG. 7. The tracks TR(k) and TR(k+1) are arranged in an order described from the outward direction to the inward direction. The track TR(k+1) is adjacent to the track TR(k) in the forward direction. In the predetermined band region, the track TR(k+1) may be subjected to shingled magnetic recording to a part of the track TR(k) in the forward direction. The track TR(k) includes sectors Sck0, Sck1, Sck2, Sck3, Sck4, Sck5, Sck6, Sck7, Sck8, Sck9, Sck10, Sck11, and a parity sector Pk. The sectors Sck0, Sck1, Sck2, Sck3, Sck4, Sck5, Sck6, Sck7, Sck8, Sck9, Sck10, Sck11, and the parity sector Pk are continuously disposed in an order described in the traveling direction. The parity sector Pk corresponds to a result obtained by performing the XOR operation on the sectors Sck0 to Sck11. The parity sector Pk is a valid parity sector. The track TR(k+1) includes sectors Sc(k+1)0, Sc(k+1)1, Sc(k+1)2, Sc(k+1)3, Sc(k+1)4, Sc(k+1)5, Sc(k+1)6, Sc(k+1)7, Sc(k+1)8, Sc(k+1)9, Sc(k+1)10, Sc(k+1)11, and a parity sector Pk+1. The sectors Sc(k+1)0, Sc(k+1)1, Sc(k+1)2, Sc(k+1)3, Sc(k+1)4, Sc(k+1)5, Sc(k+1)6, Sc(k+1)7, Sc(k+1)8, Sc(k+1)9, Sc(k+1)10, Sc(k+1)11, and the parity sector Pk+1 are continuously disposed in an order described in the traveling direction. The parity sector Pk+1 corresponds to a result obtained by performing the XOR operation on the sectors Sc(k+1)0 to Sc(k+1)11.

In the example illustrated in FIG. 9, the MPU 60 writes the sectors Sck0 to Sck11, and writes the parity sector Pk calculated by performing the XOR operation on the sectors Sck0 to Sck11 in a state of being adjacent to the sector Sck11 in the traveling direction.

In the example illustrated in FIG. 9, the MPU 60 writes the sectors Sc(k+1)0 to Sc(k+1)11, and writes the parity sector Pk calculated by performing the XOR operation on the sectors Sc(k+1)0 to Sc(k+1)11 in a state of being adjacent to the sector Sc(k+1)11 in the traveling direction.

Figure 10:
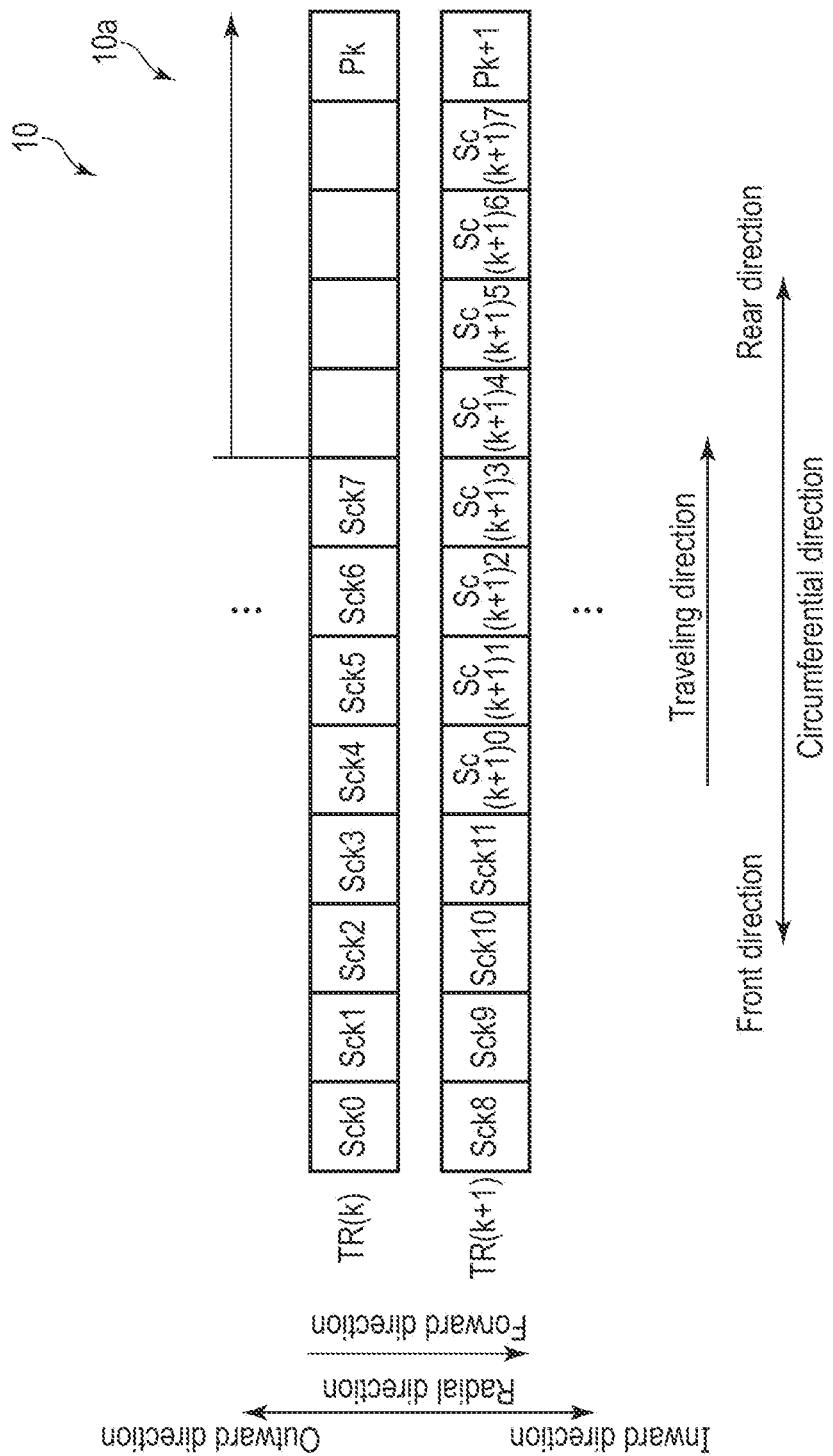
FIG. 10 is a schematic diagram illustrating an example of slip processing according to the first embodiment.

FIG. 10 is a schematic diagram illustrating an example of the slip processing according to the present embodiment. A part of the tracks TR(k) and TR(k+1) illustrated in FIG. 10 correspond to the tracks TR(k) and TR(k+1) illustrated in FIG. 9. In the track TR(k) of FIG. 10, the excessive number of times after tightening corresponding to the track TR(k) is greater than the excessive threshold value after tightening corresponding to the track TR(k) at a circumferential position adjacent to the sector Sck7 in the traveling direction, for example, at a position where the sector Sck8 is disposed in FIG. 9.

In the example illustrated in FIG. 10, when the track TR(k) is written after the tightening from the DDOL before tightening to the DDOL after tightening, the MPU 60 counts the excessive number of times after tightening at which the position error, the PES, the squeeze amount, or the off-track amount, which corresponds to the track TR(k), exceeds the DDOL after tightening. In a case where it is determined that the excessive number of times after tightening is greater than the excessive threshold value after tightening in the sector Sck8 adjacent to the sector Sck7 in the traveling direction in the track TR(k), the MPU 60 shifts (or slips) the sectors Sck8 to Sck11 to the track TR(k+1), writes the sector Sck8 as a start sector of the track TR(k+1), and writes the sectors Sck9, Sck10, Sck11, Sc(k+1)0, Sc(k+1)1, Sc(k+1)2, Sc(k+1)3, Sc(k+1)4, Sc(k+1)5, Sc(k+1)6, and Sc(k+1)7 in an order described from the sector Sck8 in the traveling direction.

In the example illustrated in FIG. 10, the MPU 60 writes the parity sector Pk+1 calculated by performing the XOR operation on the sectors Sck8 to Sc(k+1)7 in a state of being adjacent to the sector Sc(k+1)7 in the traveling direction. The MPU 60 may write the parity sector Pk calculated by performing the XOR operation on the sectors Sck0 to Sck7 in a state of being adjacent to a final sector of the track TR(k) in the traveling direction.

Figure 15:
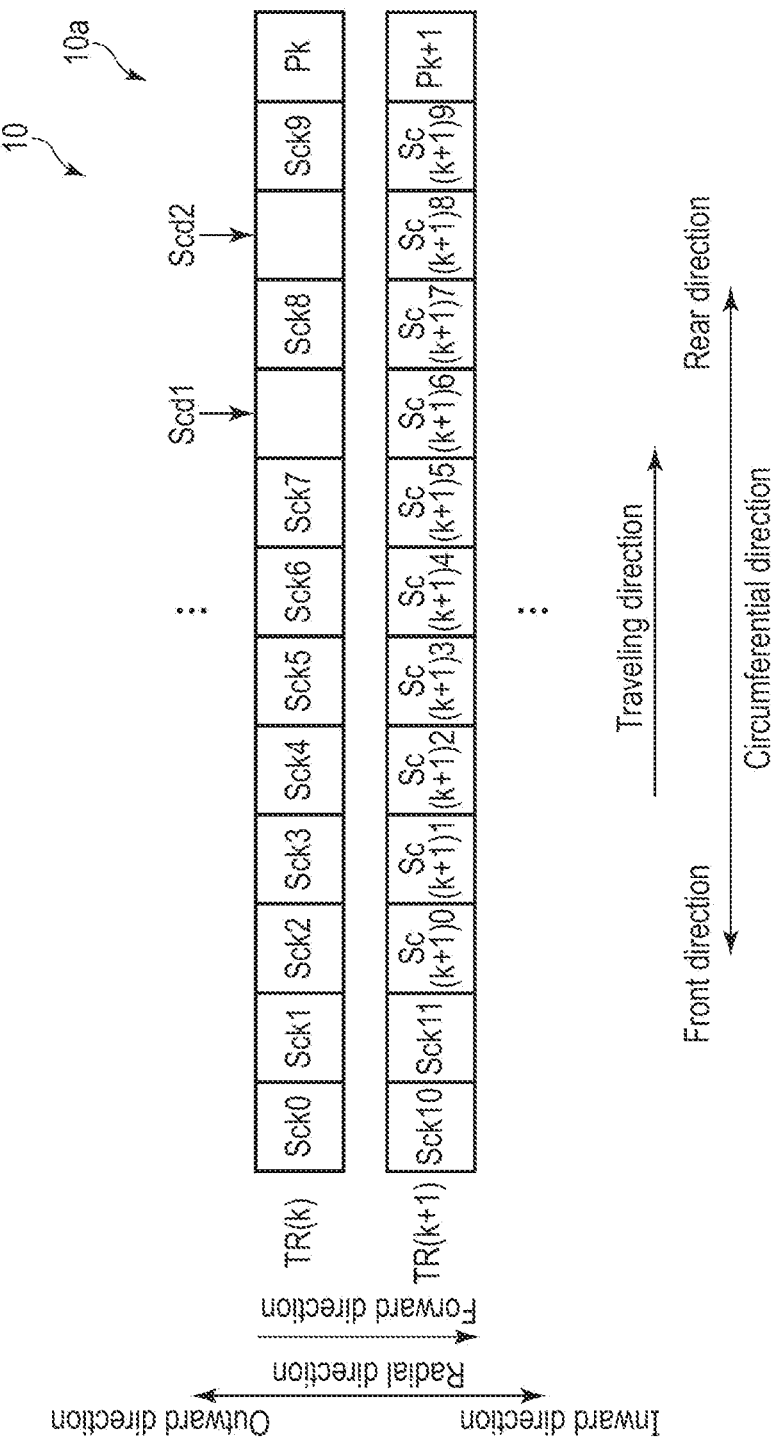
FIG. 15 is a schematic diagram illustrating an example of the slip processing according to the first embodiment.

As shown in FIG. 15, in a case where it is determined that the excessive number of times after tightening is greater than the excessive threshold value after tightening in the sector Sck8 adjacent to the sector Sck7 in the traveling direction in the track TR(k), the MPU 60 may shift (or slip) the sector Sck8 by only one in the traveling direction and write the sector Sck8 next to the sector next to the sector Sck7. The region (sector Scd1) between the sector Sck7 and the sector Sck8 becomes an unused region.

In addition, in a case where it is determined that the excessive number of times after tightening is greater than the excessive threshold value after tightening in the sector Sck9 adjacent to the sector Sck8 in the traveling direction in the track TR(k), the MPU 60 may shift (or slip) the sector Sck9 by only one in the traveling direction and write the sector Sck9 next to the sector next to the sector Sck8. The region (sector Scd2) between the sector Sck8 and the sector Sck9 becomes an unused region.

In the track TR(k+1), the sector Sck10 is written as a start sector, and the sectors Sck11, Sc(k+1)0, Sc(k+1)1, Sc(k+1)2, Sc(k+1)3, Sc(k+1)4, Sc(k+1)5, Sc(k+1)6, Sc(k+1)7, Sc(k+1)8, and Sc(k+1)9 are written in an order described from the sector Sck10 in the traveling direction.

In the example illustrated in FIG. 15, the unused region (data region) can be reduced compared to that in the example illustrated in FIG. 10, and thus the utilization efficiency of data regions (data sectors) in each track can be improved.

Next, examples of a criterion for determining whether to shift (or slip) at least one sector and a criterion for determining whether to perform the tightening processing when writing data to a track will be described.

As shown in FIG. 7 and FIG. 15, when the track TR(k) is written before the tightening processing is performed, the MPU 60 determines whether the shift amount corresponding to the track TR(k) exceeds the unrecoverable threshold value UT(k), and determines whether the shift amount exceeds the DDOL before tightening DDC(k).

In a case where it is determined that the shift amount exceeds the DDOL before tightening DDC(k) when the sector Sck8 of the track TR(k) is written during the period when it is determined that the condition for performing the tightening processing is not satisfied, the MPU 60 interrupts the write processing on the current sector (sector next to the sector Sck7), waits for the rotation, and executes the retry processing from the current sector. The MPU 60 counts the number of times at which the shift amount exceeds the DDOL before tightening DDC(k) (hereinafter, it may be referred to as the excessive number of times before tightening) in the current sector.

In a case where it is determined that the excessive number of times before tightening reaches an excessive threshold value before tightening (first specified number of times), the MPU 60 (slip processing unit 650) shifts at least one sector from the current sector. In the example of FIG. 15, one sector is shifted and the sector Scd1 thereby becomes an unused region.

Then, in a case where it is determined that the condition for performing the tightening processing is not satisfied and it is determined that the excessive number of times before tightening does not reach the excessive threshold value before tightening, the MPU 60 writes the sector Sck8 next to the sector Scd1.

After that, at the time of writing the sector Sck9, in a case where it is determined that the condition for performing the tightening processing is satisfied, the MPU 60 tightens the DDOL before tightening DDC(k) to the DDOL after tightening DDC'(k). The DDOL before tightening DDC(k) is a first DDOL and the DDOL after tightening DDC'(k) is a second DDOL.

In a case where the tightening processing is performed, the MPU 60 interrupts the write processing on the current sector (sector next to the sector Sck8), waits for the rotation, and executes the retry processing from the current sector.

At the time of writing the sector Sck9 of the track TR(k), in a case where it is determined that the shift amount exceeds the DDOL after tightening DDC'(k), the MPU 60 interrupts the write processing on the current sector (sector next to the sector Sck8), waits for the rotation, and executes the retry processing from the current sector. The MPU 60 counts the number of times at which the shift amount exceeds the DDOL after tightening DDC'(k) (excessive number of times after tightening) in the current sector.

In a case where it is determined that the excessive number of times after tightening reaches an excessive threshold value after tightening (second specified number of times), the MPU 60 (slip processing unit 650) shifts at least one sector from the current sector. In the example of FIG. 15, one sector is shifted and the sector Scd2 thereby becomes an unused region. The border between the sector Sck8 and the sector Scd2 corresponds to the circumferential position CP62 of FIG. 7.

Then, in a case where it is determined that the excessive number of times after tightening does not reach the excessive threshold value after tightening, the MPU 60 writes the sector Sck9 next to the sector Scd2.

In view of the above, the track TR(k) includes the sectors Sck0, Sck1, Sck2, Sck3, Sck4, Sck5, Sck6, Sck7, Scd1, and Sck8 of a first group which considers the first DDOL (DDOL before tightening DDC(k)), and the sectors Scd2 and Sck9 of a second group which considers the second DDOL (DDOL after tightening DDC'(k)).

In a case where it is determined that the number of times at which the shift amount exceeds the first DDOL reaches the first specified number of times (excessive threshold value before tightening) in the first sector (sector Scd1) of the sectors of the first group, the MPU 60 (slip processing unit 650) can shift at least one sector from the first sector.

In addition, in a case where it is determined that the number of times at which the shift amount exceeds the second DDOL reaches the second specified number of times (excessive threshold value after tightening) in the second sector (sector Scd2) of the sectors of the second group, the MPU 60 (slip processing unit 650) can shift at least one sector from the second sector. For example, the second specified number of times is equal to the first specified number of times.

However, the second specified number of times may be different from the first specified number of times. That is, the slip processing unit 650 may change the criterion for determining whether to shift (or slip) at least one sector before and after the tightening processing.

For example, the second specified number of times may be less than the first specified number of times. For example, the first specified number of times is five and the second specified number of times is one. This can reduce deterioration of write performance under the conditions which consider the second DDOL and the second specified number of times.

Figure 11:
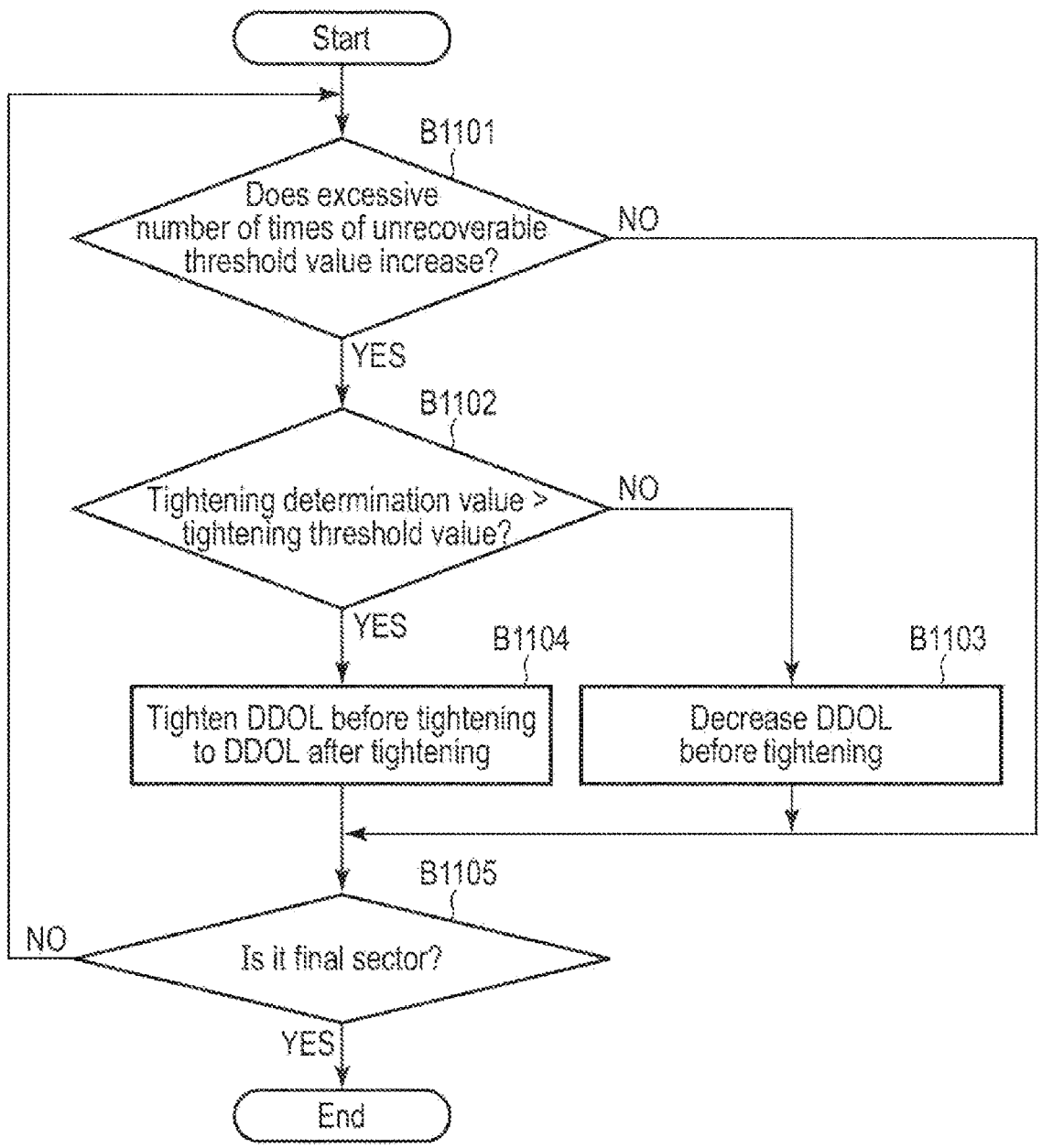
FIG. 11 is a flowchart illustrating an example of a DDOL tightening processing method according to the first embodiment.

FIG. 11 is a flowchart illustrating an example of a DDOL tightening processing method according to the present embodiment.

As shown in FIG. 11, the MPU 60 starts the write processing of the predetermined track, and determines whether or not the excessive number of times of unrecoverable threshold value increases in the predetermined sector of the predetermined track (B1101). In a case where it is determined that the excessive number of times of unrecoverable threshold value does not increase (NO in B1101), the MPU 60 causes processing to proceed to processing in B1105. In a case where it is determined that the excessive number of times of unrecoverable threshold value increases (YES in B1101), the MPU 60 determines whether the tightening determination value corresponding to the excessive number of times of unrecoverable threshold value is greater than the tightening threshold value or equal to or smaller than the tightening threshold value (B1102).

In a case where it is determined that the tightening determination value is equal to or smaller than the tightening threshold value (NO in B1102), the MPU 60 decreases the DDOL before tightening (B1103), and causes processing to proceed to processing in B1105. In a case where it is determined that the tightening determination value is greater than the tightening threshold value (YES in B1102), the MPU 60 tightens the DDOL before tightening to the DDOL after tightening (B1104), and determines whether or not the predetermined sector is the final sector of the predetermined track (B1105). In a case where it is determined that the predetermined sector is not the final sector (NO in B1105), the MPU 60 causes processing to proceed to processing in B1101. In a case where it is determining that the predetermined sector is the final sector (YES in B1105), the MPU 60 ends the processing.

Figure 12:
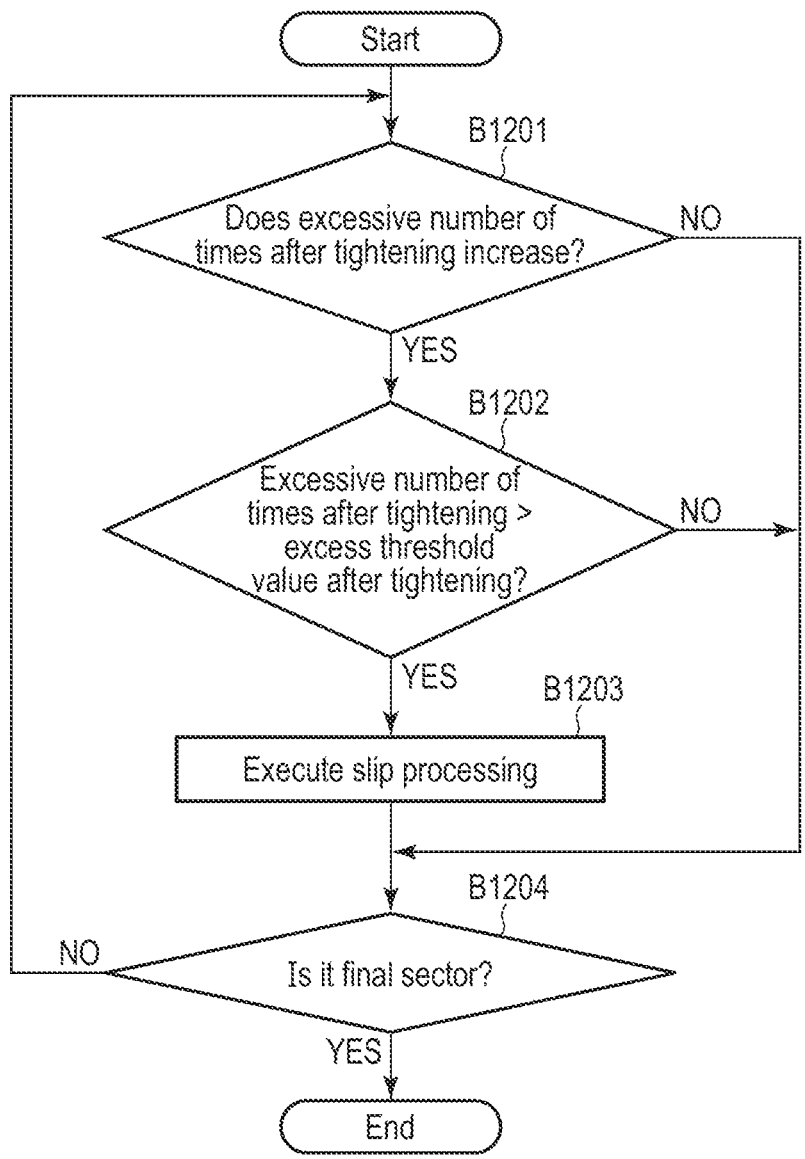
FIG. 12 is a flowchart illustrating an example of a slip processing method according to the first embodiment.

FIG. 12 is a flowchart illustrating an example of a slip processing method according to the present embodiment.

As shown in FIG. 12, the MPU 60 determines whether or not the excessive number of times after tightening increases in the predetermined sector of the predetermined track after the DDOL before tightening is tightened to the DDOL after tightening (B1201). In a case where it is determined that the excessive number of times after tightening does not increase (NO in B1201), the MPU 60 causes processing to proceed to processing in B1204. In a case where it is determined that the excessive number of times after tightening increases (YES in B1201), the MPU 60 determines whether the excessive number of times after tightening is greater than excessive threshold value after tightening or equal to or smaller than the excessive threshold value after tightening (B1202).

In a case where it is determined that the excessive number of times after tightening is equal to or smaller than the excessive threshold value after tightening (NO in B1202), the MPU 60 causes processing to proceed to processing in B1204. In a case where it is determined that the excessive number of times after tightening is greater than the excessive threshold value after tightening (YES in B1202), the MPU 60 executes the slip processing on the predetermined track (B1203). For example, in a case where it is determined that the excessive number of times after tightening is greater than the excessive threshold value after tightening, MPU 60 shifts (or slips) at least one sector from the predetermined sector to the final sector of the predetermined track, and sequentially performs writing in the traveling direction from a start sector of an adjacent track in the forward direction. The MPU 60 determines whether or not the predetermined sector is the final sector (B1204). In a case where it is determined that the predetermined sector is not the final sector (NO in B1204), the MPU 60 causes processing to proceed to processing in B1201. In a case where it is determining that the predetermined sector is the final sector (YES in B1204), the MPU 60 ends the processing.

According to the present embodiment, in a case where it is determined that the excessive number of times of unrecoverable threshold value increases in the predetermined sector of the predetermined track, the magnetic disk device 1 determines whether the tightening determination value corresponding to the excessive number of times of unrecoverable threshold value is greater than the tightening threshold value or equal to or smaller than the tightening threshold value. In a case where it is determined that the tightening determination value is greater than the tightening threshold value, the magnetic disk device 1 tightens the DDOL before tightening of each sector to the DDOL after tightening after the predetermined sector of the predetermined track. After the DDOL before tightening is tightened to the DDOL after tightening, in a case where it is determined that the excessive number of times after tightening is greater than the excessive threshold value after tightening, the magnetic disk device 1 executes the slip processing on the predetermined track. Therefore, the magnetic disk device 1 can improve recording density. Accordingly, the magnetic disk device 1 can improve reliability.

Next, magnetic disk devices according to other embodiments and modified examples will be described. In other embodiments and the modified examples, the same parts as those of the first embodiment described above are denoted by the same reference numerals, and the detailed description thereof will be omitted.

First Modified Example

A magnetic disk device 1 according to the first modified example is different from the magnetic disk device 1 according to the embodiment, which is described in the write processing method.

The MPU 60 may execute the XOR operation on data for some sectors of all the sectors of a predetermined track and write each parity data acquired as a result of the XOR operation on each data after some sectors to each parity sector of this track.

For example, the MPU 60 counts tracks in order from the start sector to the final sector and executes the XOR operation on the data of at least one odd-numbered sector (hereinafter, it may be referred to as an odd sector) in the predetermined track, and writes the parity data acquired as a result of the XOR operation on the data of the odd-numbered sector (hereinafter, it may be referred to as odd parity data) to the parity sector of this track (hereinafter, it may be referred to as an odd parity sector).

For example, the MPU 60 counts tracks in order from the start sector to the final sector and executes the XOR operation on the data of at least one even-numbered sector (hereinafter, it may be referred to as even sector) in the predetermined track, and writes the parity data acquired as a result of the XOR operation on the data of the even-numbered sector (hereinafter, it may be referred to as even parity data) to the parity sector of this track (hereinafter, it may be referred to as an even parity sector).

In the predetermined track, the MPU 60 executes track ECC processing on each error sector of this track corresponding to each parity data based on each parity data.

In the predetermined track, the MPU 60 executes the track ECC processing on an error sector of the odd sector of this track based on the odd parity data. In the predetermined track, the MPU 60 executes the track ECC processing on an error sector of the even sector of this track based on the even parity data.

The MPU 60 manages the position error, the PES, the squeeze amount, the off-track amount, the tightening determination value, and the tightening threshold value for each unit of executing the track ECC in the predetermined track. Furthermore, the MPU 60 manages the position error, the PES, the squeeze amount, the off-track amount, the tightening determination value, and the tightening threshold value, which exceed the unrecoverable threshold value, for each unit of executing the track ECC, in the predetermined track.

Figure 13:
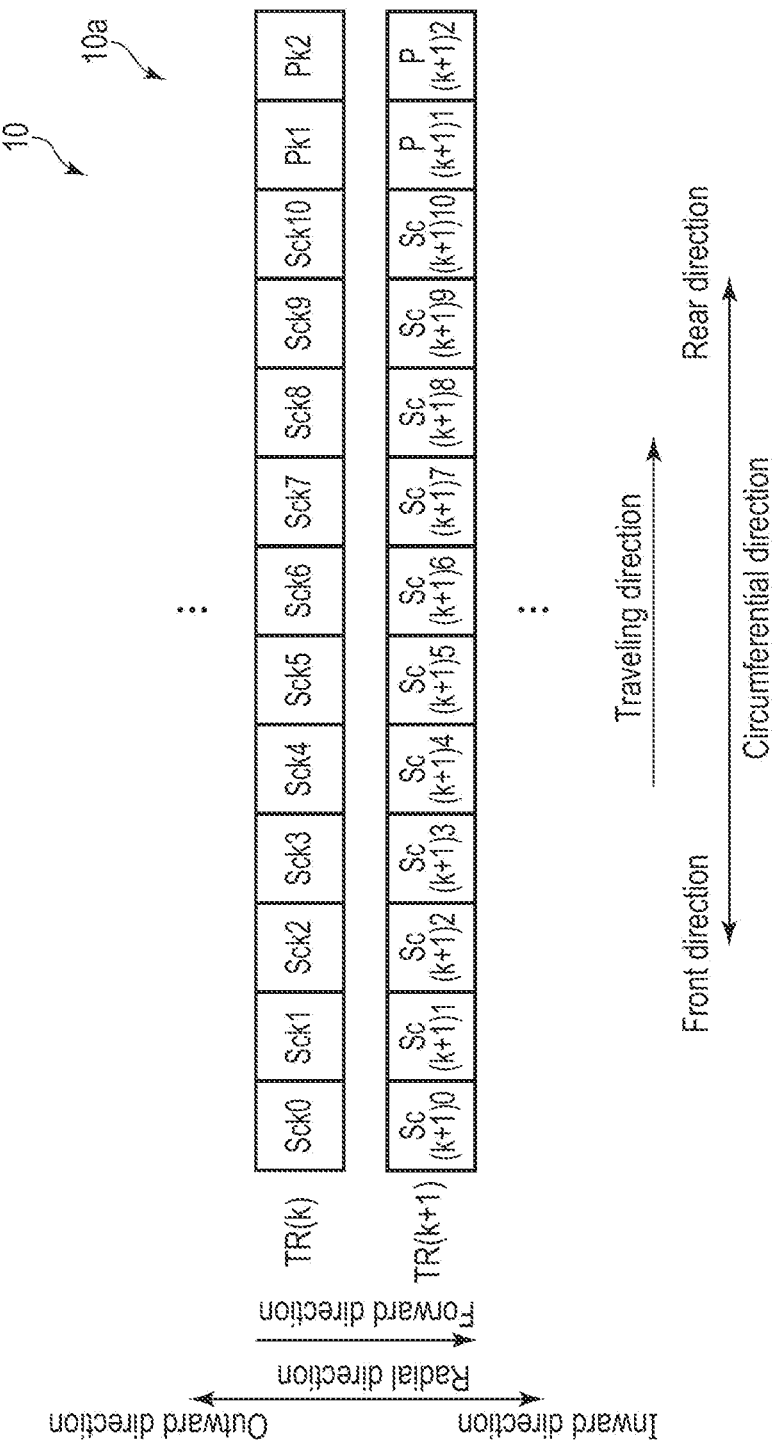
FIG. 13 is a schematic diagram illustrating an example of a configuration of a track.

FIG. 13 is a schematic diagram illustrating an example of a configuration of the track. The tracks TR(k) and TR(k+1) illustrated in FIG. 13 partially correspond to the tracks TR(k) and TR(k+1) illustrated in FIG. 9, respectively. The track TR(k) includes sectors Sck0, Sck1, Sck2, Sck3, Sck4, Sck5, Sck6, Sck7, Sck8, Sck9, Sck10, a parity sector Pk1, and a parity sector Pk2. The sectors Sck0, Sck1, Sck2, Sck3, Sck4, Sck5, Sck6, Sck7, Sck8, Sck9, Sck10, the parity sector Pk1, and the parity sector Pk2 are continuously disposed in an order described in the traveling direction. The parity sector Pk1 corresponds to a result obtained by performing the XOR operation on the sectors Sck0, Sck2, Sck4, Sck6, Sck8, and Sck10. The parity sector Pk2 corresponds to a result obtained by performing the XOR operation on the sectors Sck1, Sck3, Sck5, Sck7, and Sck9. The parity sectors Pk1 and Pk2 are valid parity sectors. The track TR(k+1) includes sectors Sc(k+1)0, Sc(k+1)1, Sc(k+1)2, Sc(k+1)3, Sc(k+1)4, Sc(k+1)5, Sc(k+1)6, Sc(k+1)7, Sc(k+1)8, Sc(k+1)9, Sc(k+1)10, a parity sector P(k+1)1, and a parity sector P(k+1)2. The sectors Sc(k+1)0, Sc(k+1)1, Sc(k+1)2, Sc(k+1)3, Sc(k+1)4, Sc(k+1)5, Sc(k+1)6, Sc(k+1)7, Sc(k+1)8, Sc(k+1)9, Sc(k+1)10, the parity sector P(k+1)1, and the parity sector P(k+1)2 are continuously disposed in an order described in the traveling direction. The parity sector P(k+1)1 corresponds to a result obtained by performing the XOR operation on the sectors Sc(k+1)0, Sc(k+1)2, Sc(k+1)4, Sc(k+1)6, Sc(k+1)8, and Sc(k+1)10. The parity sector P(k+1)2 corresponds to a result obtained by performing the XOR operation on the sectors Sc(k+1)1, Sc(k+1)3, Sc(k+1)5, Sc(k+1)7, and Sc(k+1)9. The parity sectors P(k+1)1 and P(k+1)2 are valid parity sectors.

In the example illustrated in FIG. 13, the MPU 60 writes the sectors Sck0 to Sck10, writes the parity sector Pk1 obtained by performing the XOR operation on the sectors Sck0, Sck2, Sck4, Sck6, Sck8, and Sck10 in a state of being adjacent to the sector Sck10 in the traveling direction, and writes the parity sector Pk2 obtained by performing the XOR operation on the sectors Sck1, Sck3, Sck5, Sck7, and Sck9 in a state of being adjacent to the parity sector Pk1 in the traveling direction.

In the example illustrated in FIG. 13, in the track TR(k), the MPU 60 separately manages the position error, PES, squeeze amount, off-track amount, tightening determination value, and tightening threshold value which correspond to the sectors Sck0, Sck2, Sck4, Sck6, Sck8, and Sck10, and the position error, PES, squeeze amount, off-track amount, tightening determination value, and tightening threshold value which correspond to the sectors Sck1, Sck3, Sck5, Sck7, and Sck9.

In the example illustrated in FIG. 13, the MPU 60 writes the sectors Sc(k+1)0 to Sc(k+1)10, writes the parity sector P(k+1)1 obtained by performing the XOR operation on the sectors Sc(k+1)0, Sc(k+1)2, Sc(k+1)4, Sc(k+1)6, Sc(k+1)8, and Sc(k+1)10 in a state of being adjacent to the sector Sc(k+1)10 in the traveling direction, and writes the parity sector P(k+1)2 obtained by performing the XOR operation on the sectors Sc(k+1)1, Sc(k+1)3, Sc(k+1)5, Sc(k+1)7, and Sc(k+1)9 in a state of being adjacent to the parity sector P(k+1)1 in the traveling direction.

In the example illustrated in FIG. 13, in the track TR(k+1), the MPU 60 separately manages the position error, PES, squeeze amount, off-track amount, tightening determination value, and tightening threshold value which correspond to the sectors Sc(k+1)0, Sc(k+1)2, Sc(k+1)4, Sc(k+1)6, Sc(k+1)8, and Sck(k+1)10, and the position error, PES, squeeze amount, off-track amount, tightening determination value, and tightening threshold value which correspond to the sectors Sc(k+1)1, Sc(k+1)3, Sc(k+1)5, Sc(k+1)7, and Sc(k+1)9.

According to the first modified example, the magnetic disk device 1 manages the position error, the PES, the squeeze amount, the off-track amount, the tightening determination value, and the tightening threshold value for each unit of executing the track ECC in the predetermined track. Accordingly, the magnetic disk device 1 can improve reliability.

Second Embodiment

A magnetic disk device 1 according to the second embodiment is different from the magnetic disk device 1 according to the embodiment which is described in the write processing method and the above-described modified example.

The MPU 60 stops the write processing in a case where it is determining that the position error, the PES, the squeeze amount, or the off-track amount continuously exceeds the unrecoverable threshold value a predetermined number of times (hereinafter, it may be referred to as a stop threshold value) or more.

In a case where it is determined that the position error, the PES, the squeeze amount, or the off-track amount continuously exceeds the unrecoverable threshold value by the stop threshold value or greater in a plurality of sectors continuously arranged in the circumferential direction of the predetermined track, the MPU 60 stops the write processing in this track.

For example, in a case where the stop threshold value is two, and in a case where it is determined that the position error, the PES, the squeeze amount, or the off-track amount exceeds the unrecoverable threshold value continuously two times in two sectors continuously arranged in the circumferential direction of the predetermined track, the MPU 60 stops the write processing in this track.

In a case where it is determined that the position error, the PES, the squeeze amount, or the off-track amount continuously exceeds the unrecoverable threshold value by the stop threshold value or greater in a plurality of sectors continued in a predetermined band region, the MPU 60 stops the write processing in this band region. In a case where it is determined that the position error, the PES, the squeeze amount, or the off-track amount continuously exceeds the unrecoverable threshold value by the stop threshold value or greater in continuous sectors over a plurality of the tracks in the predetermined band region, the MPU 60 stops the write processing in this band region.

For example, in a case where the stop threshold value is two, and in a case where it is determined that the position error, the PES, the squeeze amount, or the off-track amount exceeds the unrecoverable threshold value continuously two times in two sectors continued in the predetermined band region, the MPU 60 stops the write processing in this band region. In a case where the stop threshold value is two, and in a case where it is determined that the position error, the PES, the squeeze amount, or the off-track amount exceeds the unrecoverable threshold value continuously two times in the final sectors and the start sectors in two tracks continued in the forward direction in the predetermined band region, the MPU 60 stops the write processing in this band region.

For example, in the predetermined track, in a case where the unrecoverable threshold value is continuously exceeded in about ten sectors continued in the circumferential direction, a correction capability for the track ECC approaches the limit. However, in such an abnormal state of a servo, by stopping the write-operation in a case where the unrecoverable threshold value is exceeded in continuous two sectors, the correction capability for the track ECC for eight sectors is protected.

FIG. 14 is a flowchart illustrating an example of a write processing method according to the second embodiment.

As shown in FIG. 14, the MPU 60 determines whether the position error, the PES, the squeeze amount, or the off-track amount in the predetermined sector of the predetermined track exceeds or is equal to or smaller than the unrecoverable threshold value (B1401). In a case where it is determined that the position error, the PES, the squeeze amount, or the off-track amount is equal to or smaller than the unrecoverable threshold value in the predetermined sector (NO in B1401), the MPU 60 causes processing to proceed to processing in B1304. In a case where it is determined that the position error, the PES, the squeeze amount, or the off-track amount exceeds the unrecoverable threshold value in the predetermined sector (YES in B1401), the MPU 60 determines whether the position error, the PES, the squeeze amount, or the off-track amount continuously exceeds the unrecoverable threshold value by the stop threshold value or greater in the predetermined sector (B1402).

In a case where it is determined that the position error, the PES, the squeeze amount, or the off-track amount continuously exceeds the unrecoverable threshold value by the stop threshold value or greater in the predetermined sector of the predetermined track, the MPU 60 stops the write processing in this track (B1403) and ends the processing. In a case where it is determined that the position error, the PES, the squeeze amount, or the off-track amount does not continuously exceed the unrecoverable threshold value by the stop threshold value or greater in the predetermined sector (NO in B1402), the MPU 60 determines whether or not the predetermined sector is the final sector (B1404). In a case where the predetermined sector is not the final sector (NO in B1404), the MPU 60 causes processing to proceed to processing in B1301. In a case where it is determining that the predetermined sector is the final sector (YES in B1404), the MPU 60 ends the processing.

According to the second embodiment, in a case where it is determined that the position error, the PES, the squeeze amount, or the off-track amount continuously exceeds the unrecoverable threshold value by the stop threshold value or greater in the predetermined track, the magnetic disk device 1 stops the write processing on this track. Therefore, the magnetic disk device 1 can improve reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the magnetic disk device may be a magnetic disk device having separated sectors which are called split sectors. The split sectors are disclosed in, for example, US 2009/0195917 A1.

What is claimed is:

1. A magnetic disk device comprising:
a disk;
a head configured to write data to the disk and read the data from the disk; and
a controller configured to control write processing based on a first determination value corresponding to a first shift amount defined for an excessive number of times at which the first shift amount of the head in a radial direction of the disk exceeds a first threshold value causing a read error in a second track adjacent to a first track in the radial direction at a time of the write processing of the first track of the disk, and a second threshold value causing a change to the write processing.

2. The magnetic disk device according to claim 1, wherein the controller gradually decreases a first DDOL corresponding to the first track every time the first shift amount exceeds the first threshold value.

3. The magnetic disk device according to claim 1, wherein the controller stops the write processing of the first track in a case where it is determined that the first determination value is greater than the second threshold value.

4. The magnetic disk device according to claim 3, wherein the controller changes a first DDOL corresponding to the first track to a second DDOL smaller than the first DDOL in a case where it is determined that the first determination value is greater than the second threshold value.

5. The magnetic disk device according to claim 4, wherein the second DDOL is smaller than the first threshold value.

6. The magnetic disk device according to claim 4, wherein the controller shifts at least a sector of the first track in a case where the first shift amount exceeds the second DDOL by a specified number of times or greater.

7. The magnetic disk device according to claim 6, wherein the controller shifts a plurality of sectors from a first sector in which the first shift amount of the first track exceeds the second DDOL by the specified number of times to a final second sector of the first track to a third track adjacent to the first track in the radial direction on a side opposite to the second track in a case where the first shift amount exceeds the second DDOL by the specified number of times or greater.

8. The magnetic disk device according to claim 7, wherein the controller writes a result obtained by performing an XOR operation on a plurality of sectors from an initial third sector of the first track to the first sector of the first track to a first parity sector of the first track.

9. The magnetic disk device according to claim 7, wherein the controller writes a result obtained by performing an XOR operation on a plurality of sectors from an initial third sector of the first track to the first sector of the first track to a recording region different from the first track.

10. The magnetic disk device according to claim 4, wherein the controller shifts a sector in which the first threshold value is proximate to the first track by a third threshold value or greater.

11. The magnetic disk device according to claim 4, wherein the first track includes a plurality of sectors of a first group which considers the first DDOL and a plurality of sectors of a second group which considers the second DDOL, and the controller,
in a case where the number of times at which the first shift amount exceeds the first DDOL reaches a first specified number of times in a first sector of the sectors of the first group, shifts at least one sector from the first sector, and
in a case where the number of times at which the first shift amount exceeds the second DDOL reaches a second specified number of times different from the first specified number of times in a second sector of the sectors of the second group, shifts at least one sector from the second sector.

12. The magnetic disk device according to claim 11, wherein the second specified number of times is less than the first specified number of times.

13. The magnetic disk device according to claim 1, wherein the controller shifts at least a sector of the first track in a case where it is determined that the first determination value is greater than the second threshold value.

14. The magnetic disk device according to claim 1, wherein the first determination value is an average value, a maximum value, or a minimum value of the first shift amount.

15. The magnetic disk device according to claim 1, wherein the controller manages the first shift amount exceeding the first threshold value and the second threshold value every time error correction is performed in a unit of track.

16. The magnetic disk device according to claim 15, wherein the controller controls the write processing every time the error correction is performed.

17. A magnetic disk device comprising:
a disk;
a head configured to write data to the disk and read the data from the disk; and
a controller configured to control write processing in a case where a first shift amount of the head in a radial direction of the disk exceeds, continuously a plurality of times, a first threshold value causing a read error in a second track adjacent to a first track in the radial direction at a time of the write processing of the first track of the disk.

18. The magnetic disk device according to claim 17, wherein the controller stops the write processing of the first track in a case where the first shift amount exceeds the first threshold value continuously the plurality of times.

19. A write processing method which is applied to a magnetic disk device including a disk, and a head configured to write data to the disk and read the data from the disk, the method comprising:
controlling write processing based on a first determination value corresponding to a first shift amount defined for an excessive number of times at which the first shift amount of the head in a radial direction of the disk exceeds a first threshold value causing a read error in a second track adjacent to a first track in the radial direction at a time of the write processing of the first track of the disk, and a second threshold value causing a change to the write processing.

* * * * *